(12) United States Patent
Collin

(10) Patent No.: US 12,032,158 B2
(45) Date of Patent: Jul. 9, 2024

(54) DISPLAY DEVICE AND SYSTEM

(71) Applicant: Dualitas Ltd, Milton Keynes (GB)

(72) Inventor: Mikael Collin, Knowlhill (GB)

(73) Assignee: Dualitas Ltd, Milton Keynes (GB)

( * ) Notice: Subject to any disclaimer, the term of this patent is extended or adjusted under 35 U.S.C. 154(b) by 734 days.

(21) Appl. No.: 17/097,291

(22) Filed: Nov. 13, 2020

(65) Prior Publication Data

US 2021/0141221 A1 May 13, 2021

(30) Foreign Application Priority Data

Nov. 13, 2019 (GB) .................................... 1916500

(51) Int. Cl.
| | |
|---|---|
| G02B 27/01 | (2006.01) |
| G02B 27/09 | (2006.01) |
| G03H 1/02 | (2006.01) |
| G03H 1/08 | (2006.01) |
| G03H 1/22 | (2006.01) |
| G06F 7/552 | (2006.01) |

(52) U.S. Cl.
CPC ..... *G02B 27/0101* (2013.01); *G02B 27/0961* (2013.01); *G03H 1/0808* (2013.01); *G06F 7/552* (2013.01); *G03H 2001/0224* (2013.01); *G03H 2001/0816* (2013.01); *G03H 2001/0825* (2013.01); *G03H 1/2294* (2013.01)

(58) Field of Classification Search
CPC ........... G02B 27/0101; G02B 27/0961; G03H 1/0808; G03H 1/2294; G03H 1/02; G03H 1/08; G03H 2001/0224; G03H 2001/0816; G03H 2001/0825; G03H 2226/02; G09G 3/20; H03K 19/0175; G06F 7/552; G06F 7/5443; G06F 7/523; G06F 7/57; G06F 17/141; G06F 17/10
USPC ............................................................ 359/9
See application file for complete search history.

(56) References Cited

FOREIGN PATENT DOCUMENTS

| | | |
|---|---|---|
| EP | 2030072 B1 | 12/2012 |
| GB | 2498170 B | 1/2014 |
| GB | 2501112 B | 4/2014 |

(Continued)

OTHER PUBLICATIONS

Shimobaba et al (Special purpose computer for holography HORN-4 with recurrence algorithm, Comp Phys. Commun, 148 (2002) pp. 160-170) (Year: 2002).*

(Continued)

*Primary Examiner* — Stephone B Allen
*Assistant Examiner* — Jyotsna V Dabbi
(74) *Attorney, Agent, or Firm* — McDonnell Boehnen Hulbert & Berghoff LLP

(57) ABSTRACT

A logic circuit comprises a logic sub-circuit arranged to output a stream, S1, of Fresnel lens values, F(x), of a Fresnel lens for display on [m×n] pixels of a pixelated display device, and an iterative method outputs a stream, S1, of Fresnel lens values, F(x), of a Fresnel lens for display on [m×n] pixels of a pixelated display device. The circuit and method can reduce the number of multiplications used to provide each value of a stream of display values for the display device, wherein the display values include values of a Fresnel lens function. Accordingly, they can be implemented in an advanced integrated circuit, such as a field-programmable gate array.

21 Claims, 15 Drawing Sheets

(56) References Cited

FOREIGN PATENT DOCUMENTS

| | | |
|---|---|---|
| GB | 2569206 A | 12/2019 |
| SU | 1444760 A1 | 12/1988 |

OTHER PUBLICATIONS

Singh et al (Hardware acceleration for squared Euclidean distance, IJEET, vol. 11, issue 3, May 2020, pp. 186-193) (Year: 2020).*

Finnerty et al (Reduce power and cost by converting from floating point to fixed point, WP491 (v1.0) Mar. 30, 2017, pp. 1-14) (Year: 2017).*

Blinder et al (The state of the art in computer generated holography for 3D display, Light: Adv Manufacturing, Jun. 10, 2022 3:35, pp. 1-29) (Year: 2022).*

European Search Report, EP Application No. 20203328, mailed Apr. 6, 2021, 4 pages.

Shimobaba et al., "An efficient computational method suitable for hardware of computer-generated hologram with phase computation by addition", Computer Physics Communications, 2001, 138, p. 44-52.

Shimobaba et al., "Chapter 2—Numerical diffraction calculation" in Computer Holography—Acceleration Algorithms and Hardware Implementations. CRC Press, p. 15-52, 2019.

Shimobaba et al., "Chapter 3—Hologram calculation" in Computer Holography—Acceleration Algorithms and Hardware Implementations. CRC Press, p. 53-90, 2019.

Shimobaba et al., "Chapter 6—Hardware implementation" in Computer Holography—Acceleration Algorithms and Hardware Implementations. CRC Press, p. 167-198, 2019.

Chu, "Efficient Digital Holographic Image Reconstruction on Mobile Devices", Proceedings of the 2016 ACM on Multimedia Conference, 2016, MM '16, p. 107-111.

Square number, Wikipedia. https://en.wikipedia.org/w/index.php?title=Square number&oldid=924836324 (accessed Apr. 5, 2021).

Cheng et al. "Efficient FPGA-Based Fresnel Transform Architecture for Digital Holograph", Journal of Display Technology, 2014, 10(4), p. 272-281.

Combined Search and Examination Report in United Kingdom Patent Application 1916500.0, dated May 7, 2020.

* cited by examiner

Coordinate system for display device having [10 × 10] pixels (i.e. n = 10)

|    | -5 | -4 | -3 | -2 | -1 | 0    | 1 | 2 | 3 | 4 |
|----|----|----|----|----|----|------|---|---|---|---|
| -5 |    |    |    |    |    |      |   |   |   |   |
| -4 |    |    |    |    |    |      |   |   |   |   |
| -3 |    |    |    |    |    |      |   |   |   |   |
| -2 |    |    |    |    |    |      |   |   |   |   |
| -1 |    |    |    |    |    |      |   |   |   |   |
| 0  |    |    |    |    |    | 0, 0 |   |   |   |   |
| 1  |    |    |    |    |    |      |   |   |   |   |
| 2  |    |    |    |    |    |      |   |   |   |   |
| 3  |    |    |    |    |    |      |   |   |   |   |
| 4  |    |    |    |    |    |      |   |   |   |   |

| X | -5 | -4 | -3 | -2 | -1 | 0 | 1 | 2 | 3 | 4 |
|---|----|----|----|----|----|---|---|---|---|----|
|   | 25 | 16 | 9  | 4  | 1  | 0 | 1 | 4 | 9 | 16 |
|   | 25 | 16 | 9  | 4  | 1  | 0 | 1 | 4 | 9 | 16 |
|   | 25 | 16 | 9  | 4  | 1  | 0 | 1 | 4 | 9 | 16 |
|   | 25 | 16 | 9  | 4  | 1  | 0 | 1 | 4 | 9 | 16 |
|   | 25 | 16 | 9  | 4  | 1  | 0 | 1 | 4 | 9 | 16 |
|   | 25 | 16 | 9  | 4  | 1  | 0 | 1 | 4 | 9 | 16 |
|   | 25 | 16 | 9  | 4  | 1  | 0 | 1 | 4 | 9 | 16 |
|   | 25 | 16 | 9  | 4  | 1  | 0 | 1 | 4 | 9 | 16 |
|   | 25 | 16 | 9  | 4  | 1  | 0 | 1 | 4 | 9 | 16 |
|   | 25 | 16 | 9  | 4  | 1  | 0 | 1 | 4 | 9 | 16 |

| 25 | 16 | 9 | 4 | 1 | 0 | 1 | 4 | 9 | 16 | 25 | 16 | 9 | 4 | ... | 16 |

| Y | | | | | | | | | | |
|---|---|---|---|---|---|---|---|---|---|---|
| -5 | 25 | 25 | 25 | 25 | 25 | 25 | 25 | 25 | 25 | 25 |
| -4 | 16 | 16 | 16 | 16 | 16 | 16 | 16 | 16 | 16 | 16 |
| -3 | 9 | 9 | 9 | 9 | 9 | 9 | 9 | 9 | 9 | 9 |
| -2 | 4 | 4 | 4 | 4 | 4 | 4 | 4 | 4 | 4 | 4 |
| -1 | 1 | 1 | 1 | 1 | 1 | 1 | 1 | 1 | 1 | 1 |
| 0 | 0 | 0 | 0 | 0 | 0 | 0 | 0 | 0 | 0 | 0 |
| 1 | 1 | 1 | 1 | 1 | 1 | 1 | 1 | 1 | 1 | 1 |
| 2 | 4 | 4 | 4 | 4 | 4 | 4 | 4 | 4 | 4 | 4 |
| 3 | 9 | 9 | 9 | 9 | 9 | 9 | 9 | 9 | 9 | 9 |
| 4 | 16 | 16 | 16 | 16 | 16 | 16 | 16 | 16 | 16 | 16 |

| 25 | 25 | 25 | 25 | 25 | 25 | 25 | 25 | 25 | 25 | 16 | 16 | 16 | 16 | ... | 16 |
|---|---|---|---|---|---|---|---|---|---|---|---|---|---|---|---|

| SUM<br>(X^2, Y^2) | | | | | | | | | |
|---|---|---|---|---|---|---|---|---|---|
| | 50 | 41 | 34 | 29 | 26 | 25 | 26 | 29 | 34 | 41 |
| | 41 | 32 | 25 | 20 | 17 | 16 | 17 | 20 | 25 | 32 |
| | 34 | 25 | 18 | 13 | 10 | 9 | 10 | 13 | 18 | 25 |
| | 29 | 20 | 13 | 8 | 5 | 4 | 5 | 8 | 13 | 20 |
| | 26 | 17 | 10 | 5 | 2 | 1 | 2 | 5 | 10 | 17 |
| | 25 | 16 | 9 | 4 | 1 | 0 | 1 | 4 | 9 | 16 |
| | 26 | 17 | 10 | 5 | 2 | 1 | 2 | 5 | 10 | 17 |
| | 29 | 20 | 13 | 8 | 5 | 4 | 5 | 8 | 13 | 20 |
| | 34 | 25 | 18 | 13 | 10 | 9 | 10 | 13 | 18 | 25 |
| | 41 | 32 | 25 | 20 | 17 | 16 | 17 | 20 | 25 | 32 |

| 50 | 41 | 34 | 29 | 26 | 25 | 26 | 29 | 34 | 41 | 41 | 32 | 25 | 20 | ... | 32 |

FIGURE 11B

DISPLAY DEVICE AND SYSTEM

CROSS-REFERENCE TO RELATED APPLICATIONS

This application claims the benefit of priority of United Kingdom Patent Application no. 1916500.0, filed Nov. 13, 2019, which is hereby incorporated herein by reference in its entirety.

FIELD

The present disclosure relates to a projector. More specifically, the present disclosure relates to a holographic projector, a method of holographic projection and holographic projection system. Some embodiments relate to a head-up display and a head-mounted display. Some embodiments relate to a circuit for providing a stream of Fresnel lens values for display on pixels of a display device and a corresponding method.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device.

The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A moving diffuser may be used to improve image quality in devices which use coherent light such as holographic projectors.

SUMMARY

Aspects of the present disclosure are defined in the appended independent claims.

There is disclosed herein a logic circuit comprising a logic sub-circuit arranged to output a stream, S1, of Fresnel lens values, F(x), of a Fresnel lens for display on [m×n] pixels of a pixelated display device. In a first step, the logic circuit is arranged to set an initial data value stored in a first data register unit of the logic sub-circuit to $(a-k)^2$ and set an initial data value stored in a second data register unit of the logic sub-circuit to $a^2-(a-k)^2$. In a second step, the logic circuit is arranged to read the initial data value stored in the first data register unit and the initial data value stored in the second data register unit in a first iteration thereof, or to read the data value stored in the first data register unit in the preceding iteration and the data value stored in the second data register unit in the preceding iteration in further iteration thereof. In a third step, the logic circuit is arranged to sum the data value read from the first data register unit and the data value read from the second data register unit to form $x^2$. In a fourth step, the logic circuit is arranged to calculate F(x) based on $x^2$. In a fifth step, the logic circuit is arranged to output F(x) as the next value in the stream of F(x) values. In a sixth step, the logic circuit is arranged to write $x^2$ to the first data register unit. In a seventh step, the logic circuit is arranged to add $2k^2$ to the value stored in the second data register unit. In an eighth step, the logic circuit is arranged to perform further iterations comprising repeating the second to seventh steps for x=a+k, a+2k, a+3k . . . a+(n−1)k, wherein a is the starting value of x, k is an increment in x and F(a) is the first value of stream, S1.

Advanced integrated circuits, such as the field-programmable gate array, are optimized to perform complex logic functions and combinational functions but the logic blocks of these circuits can make heavy work of simple mathematical functions such as the multiplication. That is, a simple multiplication can be very demanding of resources. The present disclosure provides a logic circuit—particularly suitable for implementation in a field-programmable gate array or similar programmable or custom logic device—that reduces the number of multiplications used to provide each value of a stream of display values for a display device, wherein the display values include values of a Fresnel lens function determined using an integer square (that is, an integer multiplied by itself). The logic circuit in accordance with this disclosure calculates Fresnel lens values, which inherently require integer values to be squared, using fewer multiplications than prior art circuits. In particular, the logic circuit disclosed herein uses an arithmetic progression of integers and addition functions—in preference to a multiplication function—in order to stream square numbers. Notably, the logic circuit provides a continuous data stream of Fresnel lens values. A holographic projector may comprise a plurality of logic circuits in accordance with this disclosure. For example, each Fresnel lens value comprises an independently calculated x-component and y-component. A Fresnel lens may be required for a plurality of different colour channels such as red, green and blue. A dynamic tiling scheme may be used to display light modulation patterns including a hologram and each tiling scheme may require a different Fresnel lens function. Each individual logic sub-circuit of the present disclosure reduces the number of multiplication functions for each Fresnel lens value by two. The savings on processing are significant particularly in a real-time holographic projection system using a changeable Fresnel lens for each display event.

The logic circuit may comprise a plurality, k, of logic sub-circuits. Each logic sub-circuit comprises respective first and second data registers. The plurality of logic sub-circuits are arranged in parallel. Each logic sub-circuit is arranged to output a stream, S1 to Sk, of Fresnel lens values, F(x), by performing the first to eighth steps using a respective value of a, wherein streams S1, S2 . . . Sk correspond to a=$x_1$, $x_1+1$, $x_1+2$ . . . $x_1+(k-1)$, respectively.

Accordingly, each logic sub-circuit independently calculates a subset of the x-component Fresnel lens values F(x). In particular, each logic sub-circuit receives an arithmetic progression of integer values with a common increment k, but with a different starting value a. Thus, each logic sub-circuit outputs a corresponding stream of Fresnel lens values F(x), corresponding to a subset of the Fresnel lens values F(x). The subsets of Fresnel lens values F(x) output by the k logic sub-circuits comprise the complete set of x-component Fresnel lens values F(x).

The first logic sub-circuit may be arranged to calculate the Fresnel lens values F(x) based on $x^2$ using the following equation:

$$F(x) = \frac{\pi p_x^2}{f_x \lambda} x^2$$

wherein $f_x$ is the focal length of the Fresnel lens in the x-direction, $\lambda$ is the wavelength of light, and $p_x$ is the pixel size of the pixelated display device in the x-direction.

The Fresnel lens is centred on the centre of the pixelated display device. The origin of an x, y pixel coordinate system (0, 0) is defined at the centre of the Fresnel lens and therefore also the centre of the display device. The pixelated display device comprises [m×n] pixels. In some embodiments, the first column of pixels of the display device corresponds to x=−n/2 and the last column of pixels of the display device corresponds to x=+(n/2−1). In other embodiments, the first column of pixels of the display device corresponds to x=(1−n/2) and the last column of pixels of the display device corresponds to x=n/2. In some embodiments, the first row of pixels corresponds to y=−m/2 and the last row of pixels corresponds to y=(m/2−1). In other embodiments, the first row of pixels corresponds to y=(1−m/2) and the last row of pixels corresponds to y=m/2. It can be seen from the equation for F(x) that the x-component of the Fresnel lens is calculated by squaring the x-coordinate, x, and multiplying by a constant equal to $$\frac{\pi}{f_x \lambda} p_x^2.$$

The logic circuit may be further arranged to output a stream of Fresnel lens values, F(y), of the Fresnel lens. The logic circuit is arranged to perform the following ninth to fifteenth steps for y=b, b+1, b+2, . . . (b+m−1). In the ninth step, if y=b, the logic circuit is arranged to set the data value stored in a first further data register to $(b-1)^2$ and set the data value stored in a second further data register to $b^2-(b-1)^2$. In the tenth step, the logic circuit is arranged to read the data value stored in the first further data register of the logic circuit and the data value stored in the second further data register of the logic circuit. In the eleventh step, the logic circuit is arranged to sum the data value read from the first further data register and the data value read from the second further data register to form $y^2$. In the twelfth step, the logic circuit is arranged to calculate F(y) based on $y^2$. In the thirteenth step, the logic circuit is arranged to output F(y) as the next value in the stream of F(y) values. In the fourteenth step, the logic circuit is arranged to write $y^2$ to the first further data register. In the fifteenth step, the logic circuit is arranged to add two to the value stored in the second further data register, wherein b is the starting value of y and F(b) is the first value of the stream of Fresnel lens values, F(y).

The logic circuit may be arranged so that the thirteenth step outputs the value F(y) as the next n values in the stream of Fresnel lens values, F(y). Thus, the stream of Fresnel lens values, F(y), comprises a sequence of n consecutive values of each calculated Fresnel lens value F(y) for y=b. b+1, b+2, . . . (b+m−1).

The logic circuit may be arranged to calculate the Fresnel lens values F(y) based on $y^2$ using the following equation:

$$F(y) = \frac{\pi p_y^2}{f_y \lambda} y^2$$

wherein $f_y$ is the focal length of the Fresnel lens in the y-direction, $\lambda$ is the wavelength of light, and $p_y$ is the pixel size of the pixelated display device in the y-direction.

It can be seen from the equation for F(y) that the y-component of the Fresnel lens is calculated by squaring the y-coordinate, y, and multiplying by a constant equal to $$\frac{\pi}{f_y \lambda} p_y^2.$$

The stream of F(x) values and the stream of F(y) values may be synchronized. This is such that the F(x) and F(y) values output at the same time correspond to the same pixel of the pixelated display device. It will be understood that each pixel has a unique x, y value of the x, y pixel coordinate system. It may be said that a first stream of x-component values, F(x), and a second stream of y-component values, F(y), are synchronized.

The logic circuit is arranged to sum each F(x) value with the corresponding F(y) value in order to form the stream of Fresnel lens values, F(x, y). That is, a third data stream of Fresnel lens values is formed by summing each output of the first data stream with the corresponding output of the second data stream. It will be understood that the logic circuit effectively output pairs of corresponding F(x) and F(y) values which are then summed by the next processing block.

There is disclosed herein a logic device (e.g. field-programmable gate array, "FPGA") comprising the logic circuit. The logic circuit in accordance with this disclosure is particularly suitable for implementation in an FPGA. The logic circuit in accordance with this disclosure may also be implemented in another type of programmable logic device, "PLD", or in an application specific integrated circuit, "ASIC" or similar custom layout logic device.

There is further disclosed herein a holographic projector comprising the logic device (e.g. FPGA), a pixelated display device and a light source. The pixelated display device—e.g. a spatial light modulator such as a liquid crystal on silicon spatial light modulator—is arranged to display a light modulation pattern comprising the Fresnel lens pattern in accordance with the stream of Fresnel lens values. The light source is arranged to illuminate the Fresnel lens pattern with light having a wavelength, $\lambda$.

The logic device (e.g. FPGA) may be further arranged to add the Fresnel lens values of the stream of Fresnel lens values to hologram pixel values of a stream of hologram pixel values to form a data stream of display values. The light modulation pattern is formed in accordance with the stream of display values provided to the pixelated display device by the field programmable gate array.

There is yet further disclosed herein a head-up display comprising the holographic projector.

There is also disclosed herein a method of streaming Fresnel lens values for display on [m×n] pixels of a pixelated display device, as summarized above.

There is disclosed herein a method of streaming an ordered sequence of square numbers.

The method comprises receiving a sequence of numbers x, wherein the received sequence of numbers is an arithmetic progression of numbers having a common difference of k. The method outputs the corresponding sequence of square numbers $x^2$. That is, each output number is the square of the corresponding input number. The method comprises receiving the ordered sequence of numbers, wherein the starting value of the sequence is a. The method comprises the following steps: (a) setting an initial data value stored in a first register unit to $(a-k)^2$ and an initial data value stored in a second data register unit to $a^2-(a-k)^2$; (b) in a first iteration, reading the initial data value stored in the first data register unit and the initial data value stored in the second data register unit or in a further iteration, reading the data value stored in the first data register unit in the preceding iteration and reading the data value stored in the second data register unit in the preceding iteration; (c) summing the data value read from the first data register unit and the data value read from the second data register unit to form $x^2$; (d) calculating F(x) based on $x^2$ (e) outputting $x^2$ as the next square number in the stream of square numbers; (f) writing $x^2$ to the first data register unit; (g) adding $2k^2$ to the value stored in the second data register unit, and (h) repeating steps (b) to (g) iteratively for x=a+k, a+2k, a+3k . . . a+(n−1)k.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments may be disclosed separately in the detailed description which follows, any feature of any embodiment may be combined with any other feature or combination of features of any embodiment. That is, all possible combinations and permutations of features disclosed in the present disclosure are envisaged.

BRIEF DESCRIPTION OF THE DRAWINGS

Specific embodiments are described by way of example only with reference to the following figures:

FIG. 8 shows a coordinate system of an example display device having [n x n] pixels;

FIG. 9A shows the x-component Fresnel lens values F(x) written to the pixels of the display device of FIG. 8, and FIG. 9B shows the corresponding data stream of Fresnel lens values F(x);

FIG. 10A shows the y-component Fresnel lens values F(y) written to the pixels of the display device of FIG. 8, and FIG. 10B shows the corresponding data stream of Fresnel lens values F(y);

FIG. 11A shows the combined x-component and y-component Fresnel lens values F(x, y) written to the pixels of the display device of FIG. 8 based on the respective x and y component Fresnel lens values of FIGS. 9A and 10A; FIG. 11B shows the corresponding data stream of Fresnel lens values F(x, y)

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
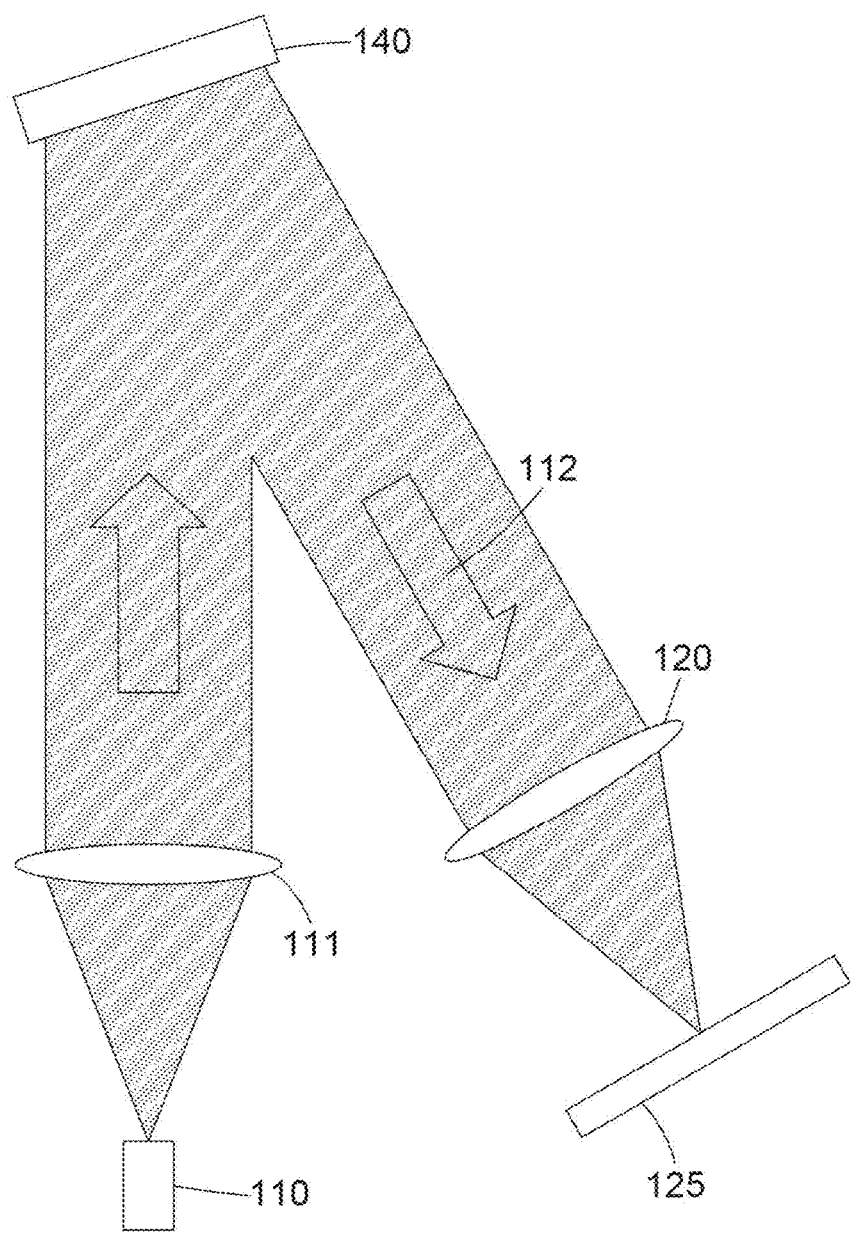
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
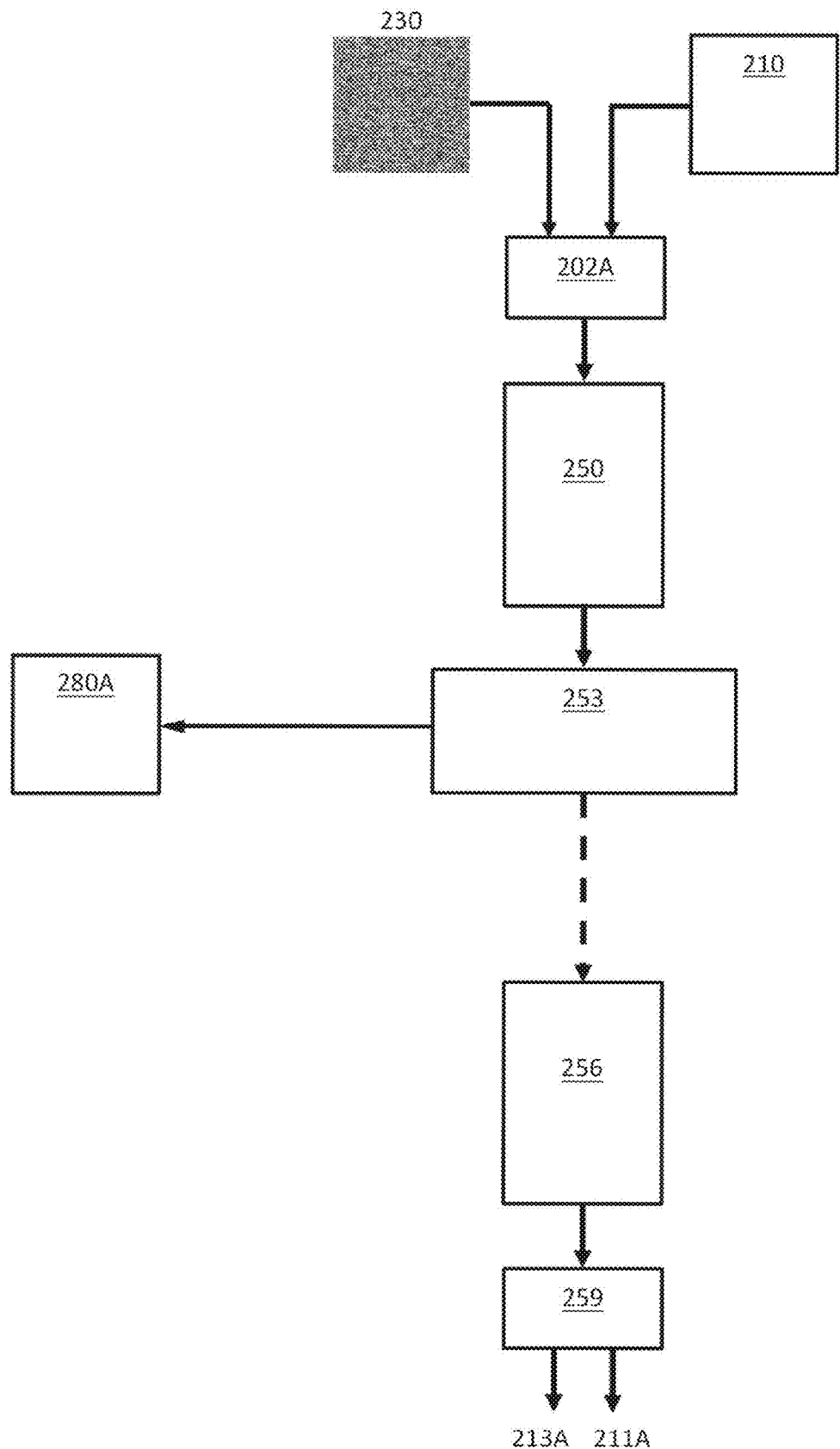
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
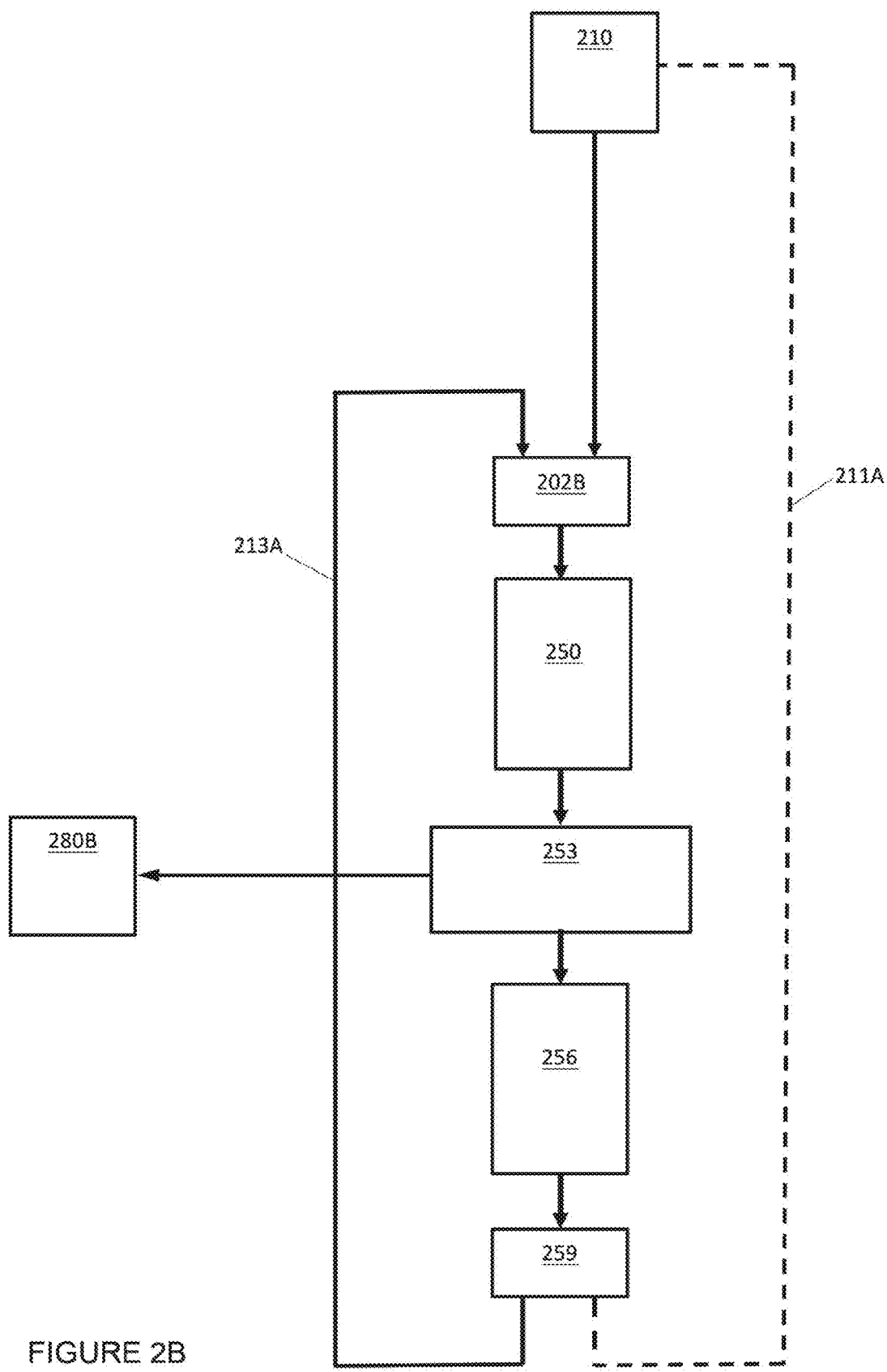
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
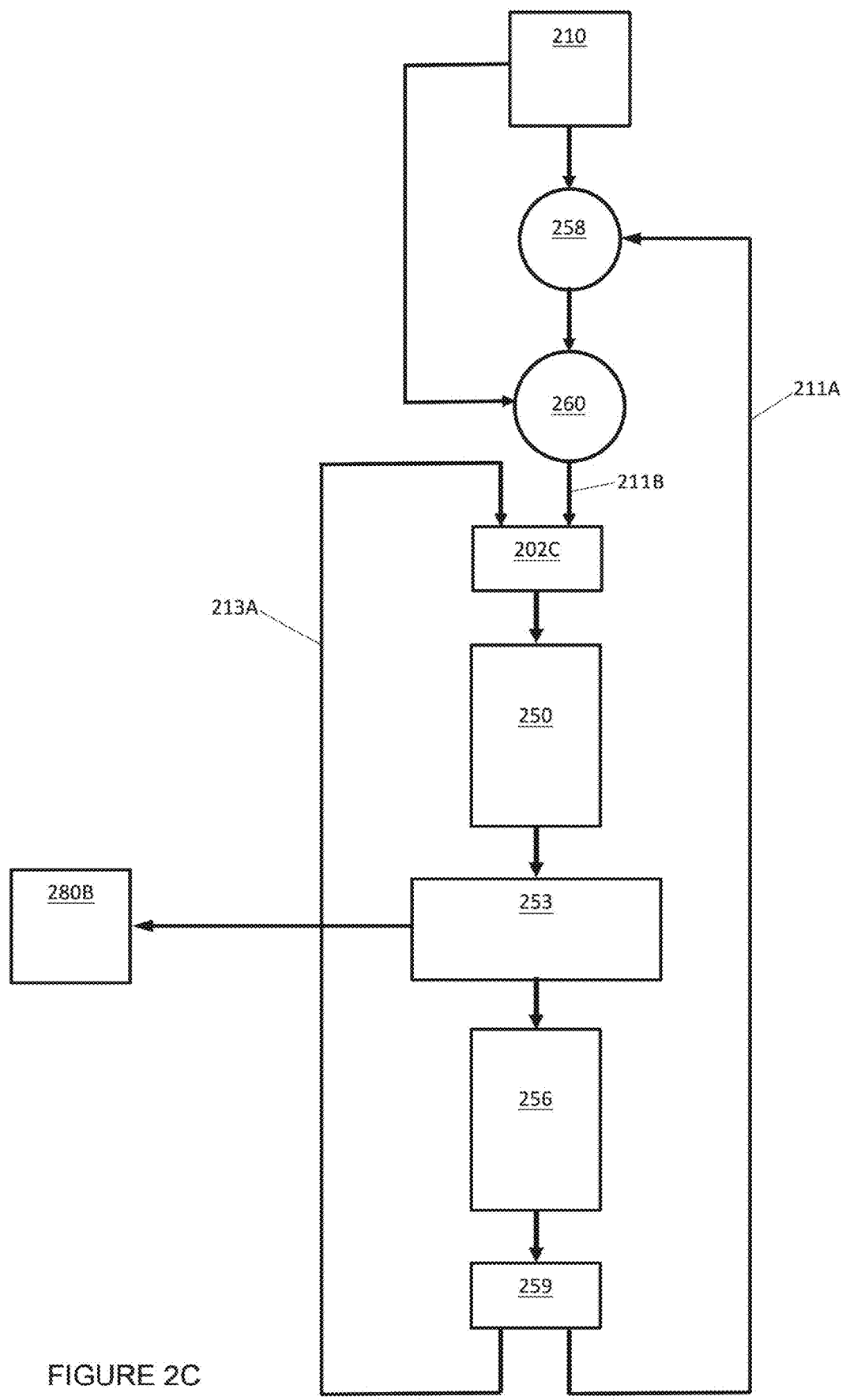
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
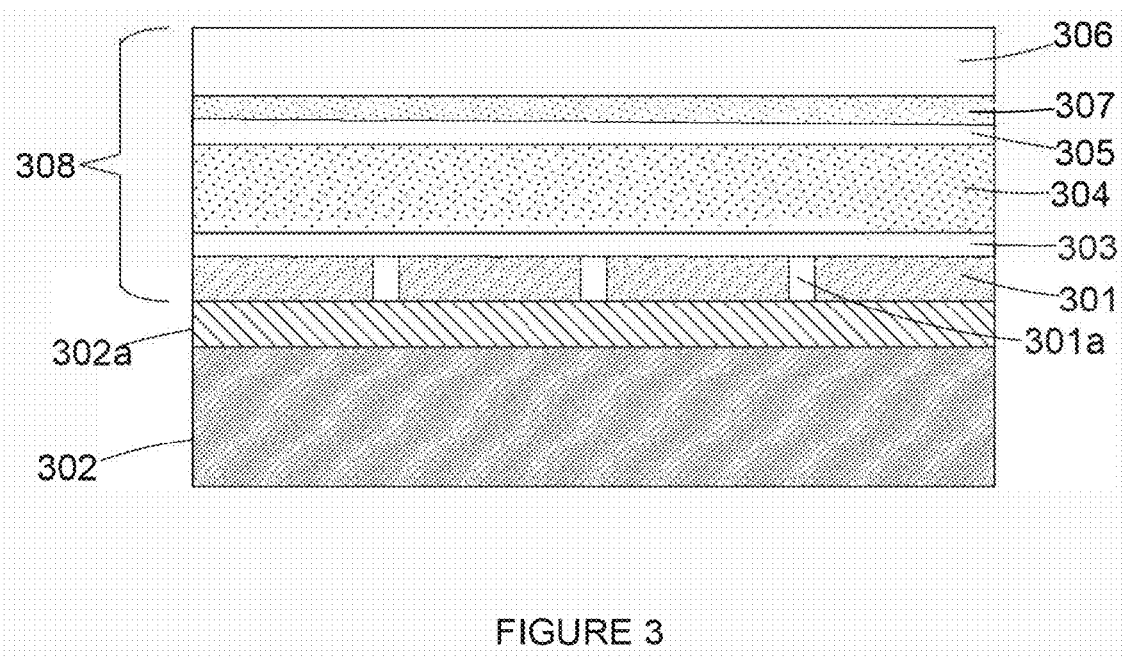
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Software Fresnel Lens Calculation

As described above, lens data representative of a lens may be written to the pixels of an SLM, wherein the lens data emulates a physical lens—that is, it brings light to a focus in the same way as the corresponding physical optic. Lens data representative of a Fresnel lens that is substantially centred on or around the centre of the pixelated SLM are calculated. The lens data is combined with holographic data and written to the pixels of the SLM. Data representative of a Fresnel lens is calculated using respective streams of integer square values corresponding to the coordinates in the x and y directions. The x component Fresnel lens values $F(x)$ are proportional to integer square values $x^2$, where the integer x is zero for the Fresnel lens value substantially at the centre of the Fresnel lens (i.e. at the origin or coordinate (0, 0)) and increases/decreases by one for each successive coordinate value in the x direction F(x). Similarly, the y component Fresnel lens values F(y) are proportional to integer square values $y^2$, where the integer y is zero for the Fresnel lens value substantially at the centre of the Fresnel lens (i.e. at the origin or coordinate (0, 0)) and increases/decreases by one for each successive coordinate value in the y direction F(y). The Fresnel lens value F(x, y) written to a pixel value P(x, y) at the coordinate (x, y) of the pixel array is calculated as the sum of the x component Fresnel lens value F(x) and the y component Fresnel lens value F(y). Accordingly, the following description refers to "x coordinate Fresnel lens values" F(x), which are calculated based on integer square values $x^2$ and "y coordinate Fresnel lens values" F(y), which are calculated based on integer square values $y^2$.

X coordinate Fresnel lens values F(x) are determined using the following equation (1):

$$F(x) = \frac{\pi p_x^2}{f_x \lambda} x^2$$

wherein $f_x$ is the focal length of the Fresnel lens in the x-direction, $\lambda$ is the wavelength of light, $p_x$ is the pixel size of the pixelated display device in the x-direction and x is the integer value of the x-coordinate.

Y coordinate Fresnel lens values F(y) are determined using the following equation (2):

$$F(y) = \frac{\pi p_y^2}{f_y \lambda} y^2$$

wherein $f_y$ is the focal length of the Fresnel lens in the y-direction, $\lambda$ is the wavelength of light, $p_y$ is the pixel size of the pixelated display device in the y-direction and y is the integer value of the y-coordinate.

Thus, the x coordinate Fresnel lens values F(x) are determined as the product of integer square values $x^2$ and the parameter $$\frac{\pi p_x^2}{f_x \lambda},$$

which is a constant for a given Fresnel lens, display device and wavelength channel. Similarly, the y coordinate Fresnel lens values F(y) are determined as the product of integer square values $y^2$ and the parameter $$\frac{\pi p_y^2}{f_y \lambda},$$

which is a constant for a given Fresnel lens, display device and wavelength channel.

The x and y coordinate Fresnel lens values F(x), F(y) are calculated using respective data streams of integer square values. The combined Fresnel lens values F(x, y) are determined as the sum of the Fresnel lens values F(x), F(y) for the corresponding x and y coordinates. The lens data are written to the array of pixels of the SLM as a data stream of Fresnel lens values F(x, y), as described further below. In practice, the lens data is calculated by a logic circuit pipeline.

Figure 4:
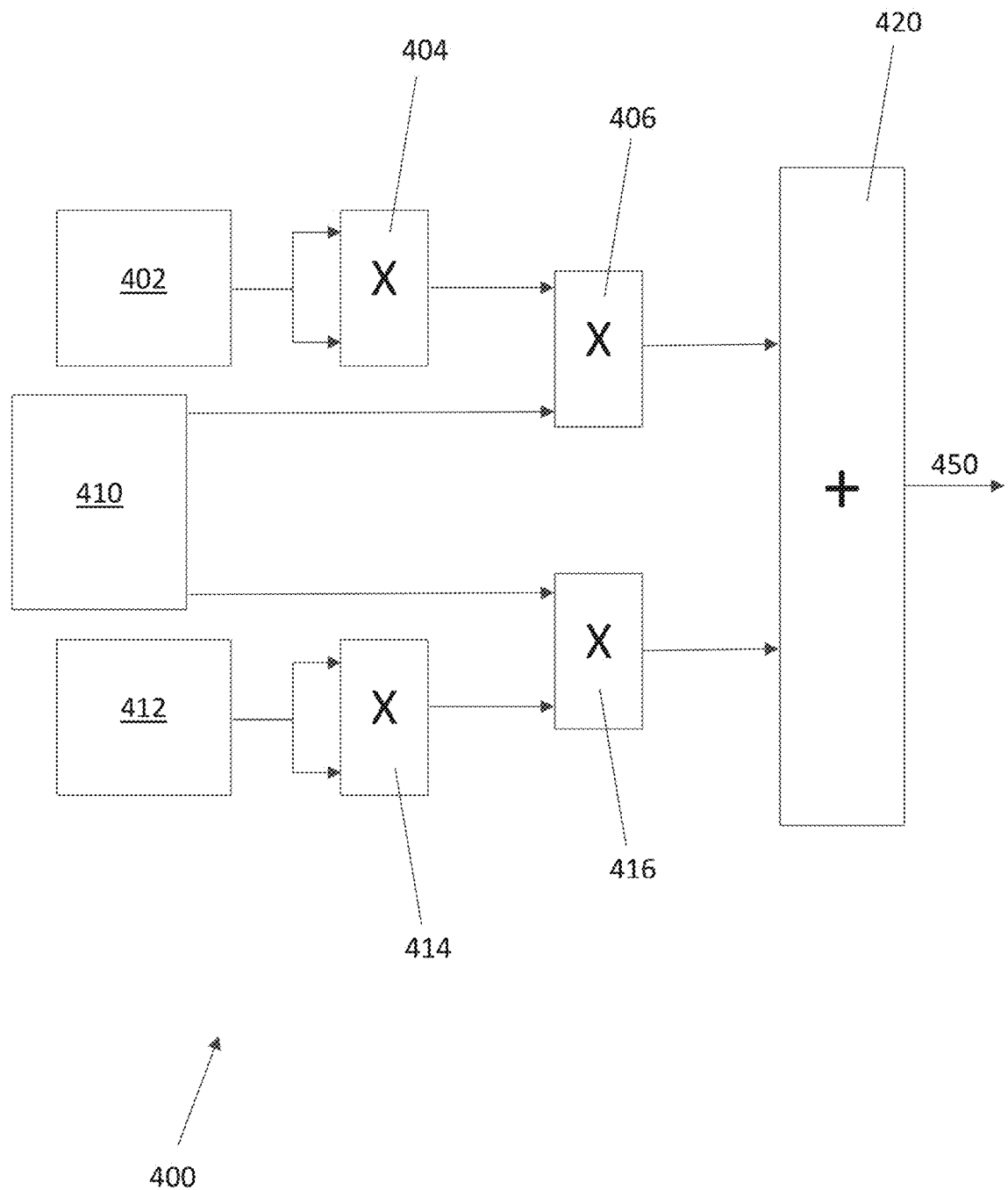
FIG. 4 shows a conventional logic circuit for providing a stream of Fresnel lens values F(x, y) for display on pixels of a pixelated display device.

The generation of a data stream of integer square values by a logic circuit in a pipeline is a complex task. In particular, the integer square function requires two floating point multipliers for each of the x and y coordinates (i.e. a total of four multipliers). FIG. 4 shows an example of the pipeline of a conventional logic circuit 400 for calculating Fresnel lens values. Logic circuit 400 comprises an x coordinate pipeline comprising x coordinate generator 402 and first and second floating point multipliers 404, 406. Logic circuit 400 further comprises a y coordinate pipeline comprising y coordinate generator 412 and third and fourth floating point multipliers 414, 416. A parameter register 410 provides the parameter $$\frac{\pi p_x^2}{f_x \lambda}$$

to the x coordinate pipeline and the parameter $$\frac{\pi p_y^2}{f_y \lambda}$$

to the y coordinate pipeline, for multiplying the respective integer square values $x^2$ and $y^2$ to determine the corresponding x and y coordinate Fresnel lens values F(x), F(y) using equations (1) and (2) above.

In the x coordinate pipeline (i.e. x coordinate logic sub-circuit), x coordinate generator 402 generates a data stream of integer values x. In particular, x coordinate generator 402 outputs a sequence of numbers, wherein the received sequence of numbers is an arithmetic progression of numbers having a common difference of one. In embodiments, for a display comprising [m×n] pixels, the sequence of integers comprises x=−n/2, −n/2+1, −n/2+2, . . . n/2−1. Accordingly, the integer x is zero at or near the centre of the n pixels in the x direction (i.e. at the origin or coordinate (0, 0) corresponding to the centre of the Fresnel lens).

First floating point multiplier 404 receives the data stream of integer values x from x coordinate generator 402 and multiplies each integer value x with itself to generate a data stream of integer square values $x^2$. Second floating point multiplier 406 receives the data stream of integer square values $x^2$ from first floating point multiplier 404 and multiplies each integer square value $x^2$ with the parameter $$\frac{\pi p_x^2}{f_x \lambda}$$

received from parameter register 410 to generate a stream of x coordinate Fresnel lens values F(x).

Similarly, in the y coordinate pipeline (i.e. y coordinate logic sub-circuit), y coordinate generator 412 generates a data stream of integer values y. In particular, y coordinate generator 412 outputs a sequence of numbers, wherein the received sequence of numbers is an arithmetic progression of numbers having a common difference of one. In embodiments, for a display comprising [m×n] pixels, the sequence of integers comprises y=−m/2, −m/2+1, −m/2+2, . . . m/2−1. Accordingly, the integer y is zero at or near the centre of the m pixels in the y direction (i.e. at the origin or coordinate (0, 0)). Third floating point multiplier 414 receives the data stream of integer values y from y coordinate generator 412 and multiplies each integer value y with itself to generate a data stream of integer square values y². Fourth floating point multiplier 416 receives the data stream of integer square values y² from third floating point multiplier 414 and multiplies each integer square value y² with the parameter $$\frac{\pi p_y^2}{f_y \lambda}$$

received from parameter register 410 to generate a stream of y coordinate Fresnel lens values F(y).

In the final stage of the pipeline of logic circuit 400, adder 420 receives the data stream of x coordinate Fresnel lens values F(x) from second floating point multiplier 406 of the x coordinate pipeline and the data stream of y coordinate Fresnel lens values F(y) from fourth floating point multiplier 416 of the y coordinate pipeline, and adds the respective values to generate an output data stream of Fresnel lens values F(x, y) 450 for writing to the pixels P(x, y) at the corresponding coordinates (x, y). The output stream of Fresnel lens values F(x, y) is written to the pixels of the array in raster scan order.

As the skilled person will appreciate, the processing pipeline required for lens function calculation involves calculating integer square values for the coordinates in both the x and y directions separately. Thus, two separate logic stages are required to calculate the integer square values. In implementations having multiple wavelength channels, such as red, green and blue channels to achieve full colour displays, two logic stages are required for each wavelength channel, so that six logic stages for calculating integer square values are required. The calculation of a data stream of integer square values is complex and time consuming compared to other logic processes. Accordingly, it would be desirable to reduce the complexity and time taken for the calculation of lens data by a processing pipeline to due integer square calculation stages.

The inventor has recognised that it is possible to calculate integer square values without the requirement for multiplication.

Figure 5:
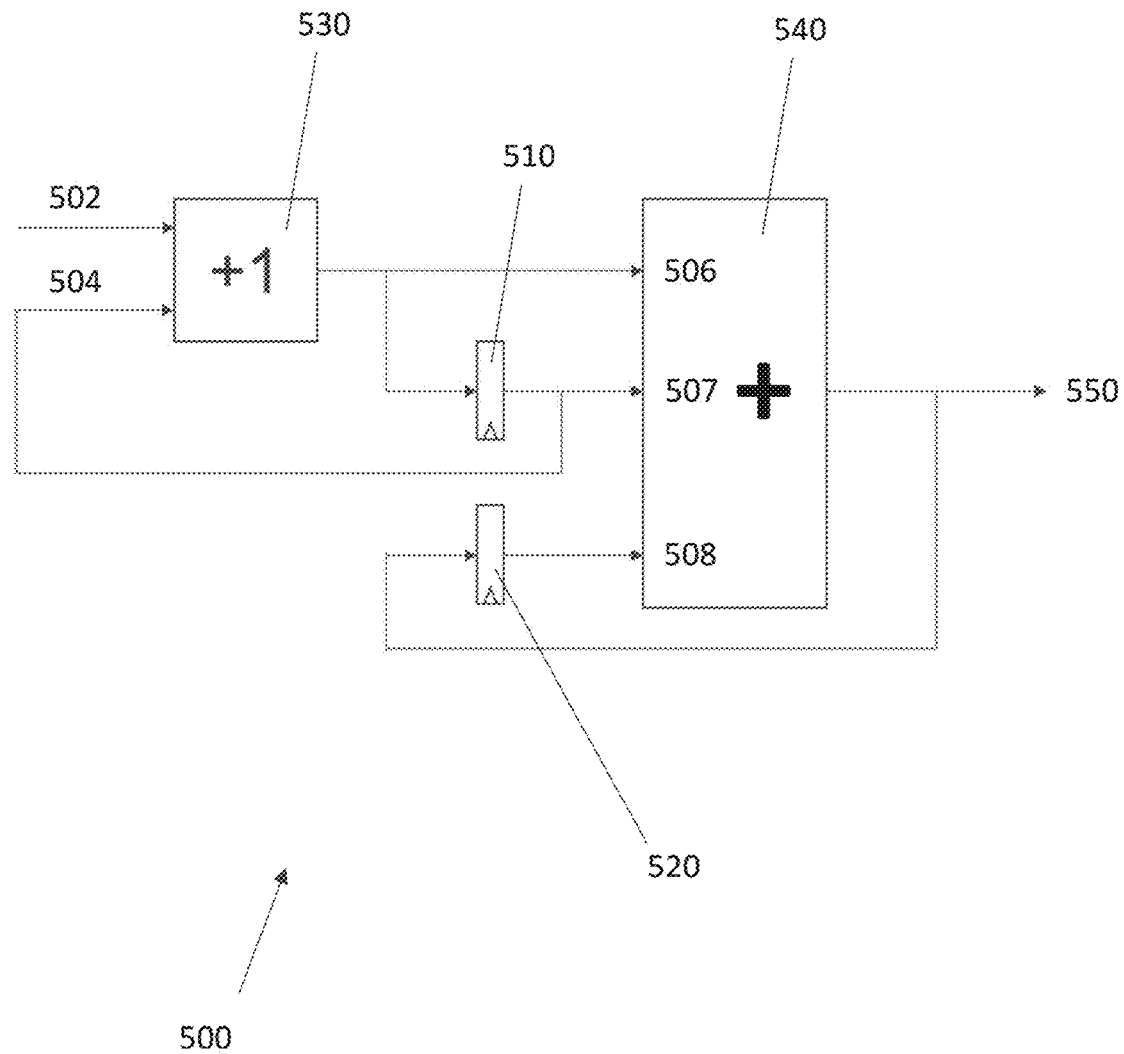
FIG. 5 shows a logic circuit for providing a stream of integer square values.

FIG. 5 shows an example of a logic circuit stage 500 for generating a stream of integer square values i² based on the equation i² (i−1)²+(i−1)+i. For example, circuit stage 500 may be used to generate integer square values x² of the x coordinate pipeline of FIG. 4. Circuit stage 500 comprises a first (+1) adder 530, first and second registers 510, 520 and second adder 540. First register 510 stores the previous input value (e.g. i−1), and second register 520 stores the previous integer square output from second adder 540 (e.g. (i−1)²). First (+1) adder 530 receives an input signal at first input 504 corresponding to the previous input value from first register 510 (e.g. i−1), and adds one (+1) to generate the current input value (e.g. i). First (+1) adder 530 may receive a reset signal at second input 502 and first and second registers 510, 520 may also receive respective reset signals at corresponding inputs (not shown), which are not described herein. Second adder 540 receives the current input value (e.g. i) from first adder 530 at third input 506, the previous input value (e.g. i−1) from first register 510 at fourth input 507 and the previous integer square value (e.g. (i−1)²) from second register 520 at fifth input 508. Second adder 540 sums the values received at its three inputs 506, 507 and 508 to generate the integer square value of the current input (e.g. i²) in accordance with the equation i²=(i−1)²+(i−1)+i.

The inventor has further recognised that given an ordered input stream of integers in a sequence comprising an arithmetic progression of integer values with a difference or increment between consecutive integer values of one, such as {0, 1, 2, 3, 4, 5 . . . }, it is possible to calculate the corresponding ordered stream of integer square values {0, 1, 4, 9, 16, 25 . . . } more simply. This is possible because the integer square values in the sequence follow a pattern. In particular, for consecutive integer square values in the sequence, the value of the difference between one integer square value and the previous integer square value in the sequence always increases by two (+2). This is true for positive and negative integer values as illustrated by the following table:

TABLE 1

| Integer value, X | Integer square value, X² | Integer square difference value, (X² − (X − 1)²) |
| --- | --- | --- |
| −5 | 25 | (25 − 36) = −11 |
| −4 | 16 | (16 − 25) = −9 |
| −3 | 9 | (9 − 16) = −7 |
| −2 | 4 | (4 − 9) = −5 |
| −1 | 1 | (1 − 4) = −3 |
| 0 | 0 | (0 − 1) = −1 |
| 1 | 1 | (1 − 0) = 1 |
| 2 | 4 | (4 − 1) = 3 |
| 3 | 9 | (9 − 4) = 5 |
| 4 | 16 | (16 − 9) = 7 |

Figure 6:
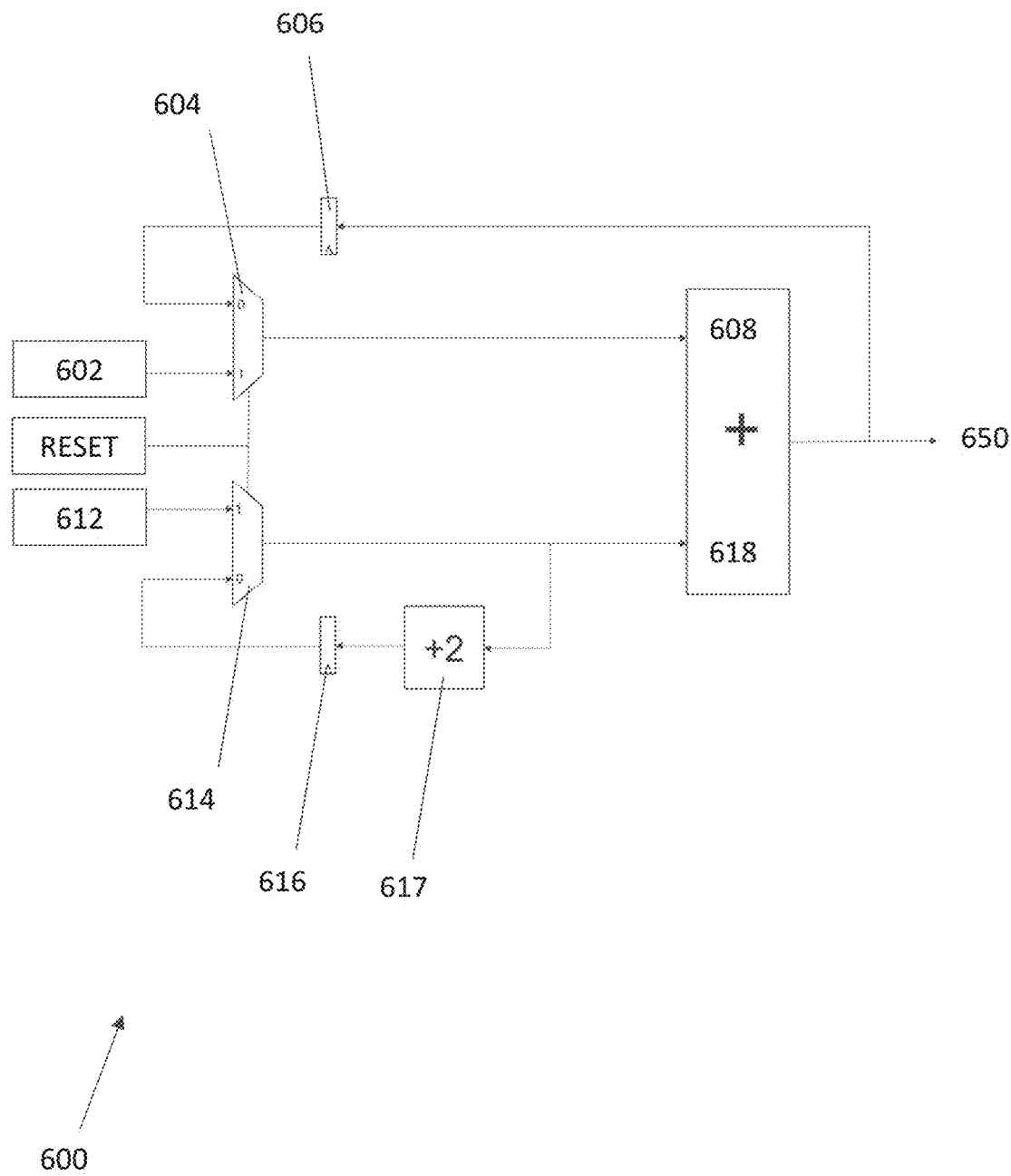
FIG. 6 shows a logic circuit for providing a stream of integer square values in accordance with embodiments.

FIG. 6 shows an example of a circuit stage 600 for generating a stream of integer square values (e.g. x²) in accordance with embodiments. In particular, circuit stage 600 calculates a current integer square value ((X+1)²) using: (a) the previous integer square (X²)—herein called value "A", and (b) the sum of two plus the previous difference between the integer squares ((X²−(X−1)²)—herein called value "B". By virtue of the addition of two to the previous difference value, the new value B is the "integer square difference value" for the current calculation (herein called "difference value" for simplicity). During operation, the result of a current calculation is output as the current integer square value. In addition, the result of the current calculation is fed back and stored in a first register unit to be used in the next calculation as the previous integer square value (value A). In addition, two (2) is added to the difference value used in the current calculation, and the result is stored in a second register unit as the new value B to be used in the next calculation. In the calculation (or "iteration") of a first integer square value in the stream, values of A and B for the calculation are input to the circuit stage (i.e. first register unit and second register unit, respectively), rather than being received as feedback from a previous calculation (or "iteration"). The input of such initial or starting values of A and B may be associated with a reset signal, as in the example circuit stage 600 of FIG. 6 described below.

Circuit stage 600 comprises first and second input registers 602, 612, first and second multiplexers 604, 614, first adder 620, second (+2) adder 617 and first and second data registers 606, 616. In this example, first input register 602, first multiplexer 604 and first data register 606 form a first register unit for providing a value A for the next calculation. Similarly, second input register 612, second multiplexer 614 and second data register 616 form a second register unit for providing a value B for the next calculation.

As the skilled person will appreciate from the following description, the stream of integer square values in the x direction used to calculate the x coordinate Fresnel lens value is the same for each row in the pixel array. Thus, a reset signal is used at the start of each row, to reinitiate generation of the sequence of integer square values in the x direction. The stream of integer square values in the y direction used to calculate the y coordinate Fresnel lens value is the same for each column in the pixel array. This means that the same integer square value in the y direction is used to calculate every y coordinate Fresnel lens value in the same row. This can be achieved using various techniques, as discussed below.

The following example illustrates the operation of circuit stage 600 for generating a stream of n integer square values $x^2$ in the x direction used to calculate n x coordinate Fresnel lens values F(x) corresponding to n pixels in a row. In the example, the coordinates of the n pixels in a row are numbered from $-n/2$ to $n/2-1$.

In the presence of a reset signal, first multiplexer 604 selects and outputs a value A received at first ("1") input from first input register 602 and second multiplexer 614 selects and outputs a value B received at its first ("1") input from second input register 612. Input register 602 provides an initial integer square value A for the sequence on integer values, and input register 612 provides an initial difference value B for the sequence. The initial values A and B from input registers 602 and 612 are predetermined for calculating the first integer square value of the sequence. In particular, since the first x coordinate value in a row is $-n/2$ (also referred to herein as the "starting value for x") the initial integer square value A received from first input register 602 is $(-n/2-1)^2$ and the initial difference value B received from second input register 612 is $(-n/2)^2-(-n/2-1)^2$ since $(-n/2-1)$ corresponds to the previous value for x for the starting value $-n/2$. For example, in Table 1, there are 10 pixels in the x direction numbered from $-5$ to $4$, and so the starting integer square value A is $(-6)^2$ (i.e. 36) and the starting difference value B is $(-5)^2-(-6)^2$ (i.e. $-11$). In the absence of a reset signal, first multiplexer 604 selects and outputs a value A received at its second ("0") input from first data register 606, and second multiplexer 614 selects and outputs a value B received at its second ("0") input from second data register 616. First and second data registers 606, 616 store respective values for A and B above, based on feedback from the previous (i.e. immediately preceding) calculation as described below.

First adder 620 receives the output values A and B from first and second multiplexers 604, 614 at its first and second inputs 608, 618, respectively. First adder 620 adds together the values A and B and outputs the current integer square value 650. The current integer square value 650 is also fed back and stored in first data register 606. Thus, the value stored in first register 606 corresponds to the previous integer square value A for the next calculation, which is selected and output by first multiplexer 604 in the absence of a reset signal. In addition, the output value B of second multiplexer 614 is fed back to second (+2) adder 617. Second adder 617 adds two (+2) to the received value B to generate a new difference value B which is stored in second data register 616. Thus, the value B stored in second register 616 corresponds to the difference value for the next calculation, which is selected and output by second multiplexer 614 in the absence of a reset signal.

Table 2 shows an example to illustrates the operation of the circuit stage 600 of FIG. 6 comprising first and second data registers 606, 616 corresponding to the example shown in Table 1. The example shows an ordered sequence of 10 integer values x from $-5$ to $4$, the above described values A and B respectively stored in first and second registers 606, 616, and the corresponding addition A+B performed by first adder 620 to generate the corresponding stream of integer square values $x^2$.

TABLE 2

| X     | -5  | -4 | -3 | -2 | -1 | 0  | 1 | 2 | 3 | 4  |
|-------|-----|----|----|----|----|----|---|---|---|----|
| A     | 36  | 25 | 16 | 9  | 4  | 1  | 0 | 1 | 4 | 9  |
| B     | -11 | -9 | -7 | -5 | -3 | -1 | 1 | 3 | 5 | 7  |
| A + B | 25  | 16 | 9  | 4  | 1  | 0  | 1 | 4 | 9 | 16 |

As can be seen from Table 2, the calculation A+B determines the integer square value $X^2$, for both positive and negative integer values. As the skilled person will appreciate, Table 2 merely illustrates the calculation of a sequence of integer square values for the particular example coordinate system for n=10 and x is $-5$ to $4$, suitable for calculating x coordinate Fresnel lens values as described herein. Many other examples are possible and contemplated by the present disclosure.

In operation, circuit stage 600 iteratively generates the sequence of x coordinate integer square values $x^2$ for calculating the x coordinate Fresnel lens values F(x) for each row of an array of [m×n] pixels. Since pixel values comprising the Fresnel lens values are typically streamed to an array of pixels of a spatial light modulator in raster scan order (i.e. row by row), the reset signal is applied at the start of each row. The stream of x coordinate Fresnel lens values F(x) is illustrated in FIGS. 9A and 9B described below.

Circuit stage 600 may also be used to generate a sequence of y coordinate integer square values $y^2$ for calculating the y coordinate Fresnel lens values F(y) for an array of [m×n] pixels. As mentioned above, since the Fresnel lens values are streamed to the pixel array row by row, the same y coordinate integer square value $y^2$ is used for calculating the y coordinate Fresnel lens value F(y) of each pixel in a row. Thus, in embodiments, circuit stage 600 may output each y coordinate integer square value $y^2$ calculated by first adder 620 n times before beginning the next iteration to calculate the next integer square value $(y+1)^2$. In other embodiments, each integer square value $y^2$ output by the first adder 620 may be provided to a buffer (not shown) that buffers the integer square value $y^2$. The integer square value $y^2$ stored in the buffer may then be read out n times for calculating the stream of y coordinate Fourier lens values F(y). In still further embodiments, the buffer may be provided after the calculation of the y coordinate Fourier lens values F(y). The stream of y coordinate Fourier lens values F(y) is illustrated in FIGS. 10A and 10B described below. The skilled person will appreciate that any suitable circuit arrangement may be used to modify the circuit stage 600 so as output a stream of integer square values $y^2$ comprising n consecutive instances or replications of each y coordinate integer square values $y^2$ calculated by first adder 620. The skilled person will also appreciate that the calculation of the y coordinate Fresnel lens values F(y) involves fewer iterations of the circuit stage 600 that the corresponding calculation of the x coordinate Fresnel lens values F(x).

Accordingly, circuit stage 600 generates an output sequence of integer square values, in response to an input sequence comprising an arithmetic progression of integers having a common difference of one that may comprise negative, zero and positive integers, in a simple, less complex and more efficient logic process, which avoids the need for a multiplication function using floating point multipliers.

The circuit stage 600 of FIG. 6 illustrates just one example of a first register unit for providing the value A for the next calculation, and a second register unit for providing the value B for the next calculation. As the skilled person will appreciate, in other examples, first and second input registers 602, 612 and first and second multiplexers 604, 614 may be omitted. In particular, the first register unit may comprise only first data register 606 and the second register unit may comprise only second data register 616. In this case, the initial values of A and B may be written directly to first and second data registers 606, 616, respectively, upon reset.

Figure 7:
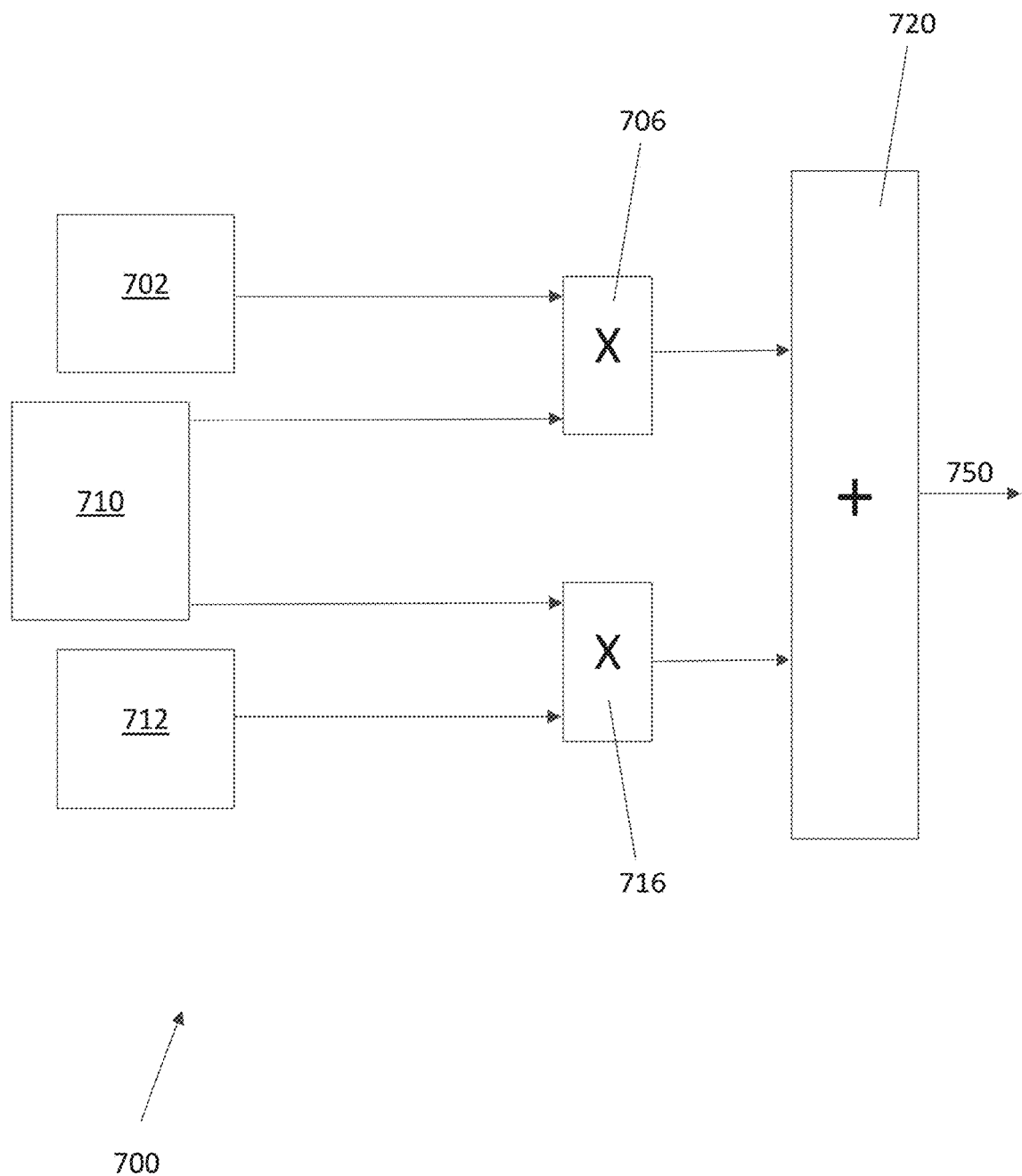
FIG. 7 shows a logic circuit for providing a stream of Fresnel lens values F(x, y) for display on pixels of a pixelated display device in accordance with embodiments.

FIG. 7 shows a logic circuit 700 for providing a stream of Fresnel lens values F(x, y) for display on pixels of a pixelated display device in accordance with embodiments. Logic circuit 700 is similar to the conventional logic circuit 400 of FIG. 4 but with the implementation of the circuit stage 600 of FIG. 6 for generating respective streams of integer square values $x^2$ and $y^2$ for the x and y directions.

In particular, logic circuit 700 comprises an x coordinate pipeline comprising first integer square circuit stage 702 for generating a stream of integer square values $x^2$ corresponding to the x coordinates of pixels in the x direction and first floating point multiplier 706. Logic circuit 700 further comprises a y coordinate pipeline comprising second integer square circuit stage 712 for generating a stream of integer square values $y^2$ corresponding to the y coordinates of pixels in the y direction and second floating point multiplier 716.

A parameter register 710 provides the parameter $$\frac{\pi p_x^2}{f_x \lambda}$$

to first floating point multiplier 706 and the parameter $$\frac{\pi p_y^2}{f_y \lambda}$$

to second floating point multiplier. First floating point multiplier 706 multiplies the integer square values $x^2$ received from first integer square circuit stage 702 with the parameter received from parameter register 710 and outputs the corresponding stream of x coordinate Fresnel lens values F(x) in accordance with equation (1) above. Similarly, second floating point multiplier 716 multiplies the integer square values $y^2$ received from second integer square circuit stage 712 with the parameter received from parameter register 710 and outputs the corresponding stream of y coordinate Fresnel lens values F(y) in accordance with using equation (2) above.

In the final stage of the pipeline of logic circuit 700, adder 720 receives the data stream of x coordinate Fresnel lens values F(x) from first floating point multiplier 706 of the x coordinate pipeline and the data stream of y coordinate Fresnel lens values F(y) from second floating point multiplier 716 of the y coordinate pipeline. The x coordinate pipeline and the y coordinate pipeline are synchronized so that the corresponding x and y coordinate Fresnel lens values are output to adder 720 at substantially the same time. Adder 720 adds together the respective values to generate an output data stream of combined Fresnel lens values F(x, y) 750 for combining with hologram pixel values and writing to the pixels P(x, y) at the corresponding coordinates (x, y) as described above.

Accordingly, the logic circuit 700 of FIG. 7 comprises just two floating point multipliers 716, 716, thereby reducing the total number of floating point multipliers required by two in comparison to the conventional logic circuit 400 of FIG. 4.

The logic circuit 700 of FIG. 7 may be implemented in a programmable logic device, "PLD", such as a field-programmable gate array, "FPGA", comprising the logic circuit. In particular, the logic stages and logic components forming the logic circuit 700 of FIG. 7 are particularly suitable for implementation in an FPGA using conventional FPGA design programming. The FPGA may further comprise a logic circuit for adding hologram data to the lens data to form a data stream of display values. The FPGA may then write the data stream of display values to the pixels of the SLM for display thereof. As the skilled person will appreciate, the logic circuit 700 may also be implemented in an application specific integrated circuit, "ASIC" or other custom logic device. In particular, the logic stages and components of the logic circuit may also be readily implemented in a standard ASIC device or a structured ASIC device.

Writing Fresnel Lens Values of a Pixel Array of a Display Device

As described herein, a data stream of Fresnel lens values F(x, y) are written as lens data for display on [m×n] pixels of a pixelated display device (e.g. SLM) as described herein. A coordinate system of the pixels P(x, y) of the [m×n] pixel array is defined, which centres the Fresnel lens at around the centre of the pixel array. In particular, in an embodiment, the columns of pixels in the [m×n] pixel array are numbered with coordinates from −n/2 to n/2−1 corresponding to the pixel coordinates in the x direction, and the rows of pixels are numbered with coordinates from −m/2 to (m/2−1) corresponding to the pixel coordinates in the y direction. The Fresnel lens value F(0, 0) corresponding to the centre of the Fresnel lens (i.e. based on integer/integer square value 0 in the x and y directions) is written to the pixel P(0, 0) at the origin or coordinate (0, 0).

FIG. 8 shows an example of this coordinate system of the pixels P(x, y) of a pixelated display device comprising an array of 10×10 pixels. The coordinates in the x direction are numbered from −5 to 4 (as in Tables 1 and 2 above) and the coordinates in the y directions are numbered from −5 to 4. Thus, the coordinate (0, 0), corresponding to the origin of the coordinate system, is around the centre of the 10×10 pixel array as shown in FIG. 8.

In embodiments, the x coordinate values of the pixels of the pixel array are used as the stream of integer values x that are input to the logic circuit 700 of the embodiment of FIG. 7, in order to derive the corresponding stream of x coordinate Fresnel lens values F(x). FIG. 9A illustrates the x coordinate Fresnel lens values F(x) that may be written to the 10×10 pixel array of FIG. 8, assuming the parameter $$\frac{\pi p_x^2}{f_x \lambda}$$

of unity (one). This corresponds to the stream of integer square values $x^2$ (for x=−5 to 4) generated and output by the circuit stage 600 of the embodiment of FIG. 6, with a reset at the start of each row. FIG. 9B shows the corresponding data stream, which is output in raster scan order (i.e. row by row). The stream of x coordinate Fresnel lens values F(x) is calculated from the ordered sequence comprising the n x coordinate integer square values $x^2$ (for x=−5 to 4) repeated m times. As the skilled person will appreciate, FIGS. 9A and 9B are illustrative only, since only the x coordinate Fresnel lens values F(x) are depicted.

Similarly, in embodiments, the y coordinate values of the pixels of the pixel array are used as the stream of integer values y that are input to the logic circuit 700 of FIG. 7 in accordance with embodiments, in order to derive the corresponding stream of y coordinate Fresnel lens values F(y). FIG. 10A illustrates the y coordinate Fresnel lens values F(y) that may be written to the 10×10 pixel array of FIG. 8, assuming the parameter $$\frac{\pi p_y^2}{f_y \lambda}$$

of unity (one). This corresponds to the stream of integer square values $y^2$ (for y=−5 to 4) generated and output by the circuit stage 600 of the embodiment of FIG. 6. As shown in FIG. 10A, the y coordinate Fresnel lens values F(y) are the same in each pixel in a row (i.e. calculated from the same integer square value). FIG. 10B shows the corresponding data stream, which is output in raster scan order. The stream of y coordinate Fresnel lens values F(y) thus comprises an ordered sequence comprising n consecutive instances or repetitions of each of the m y coordinate integer square values $y^2$. As the skilled person will appreciate, FIGS. 10A and 10B are illustrative only, since only the y coordinate Fresnel lens values F(y) are depicted.

Figure 11C:
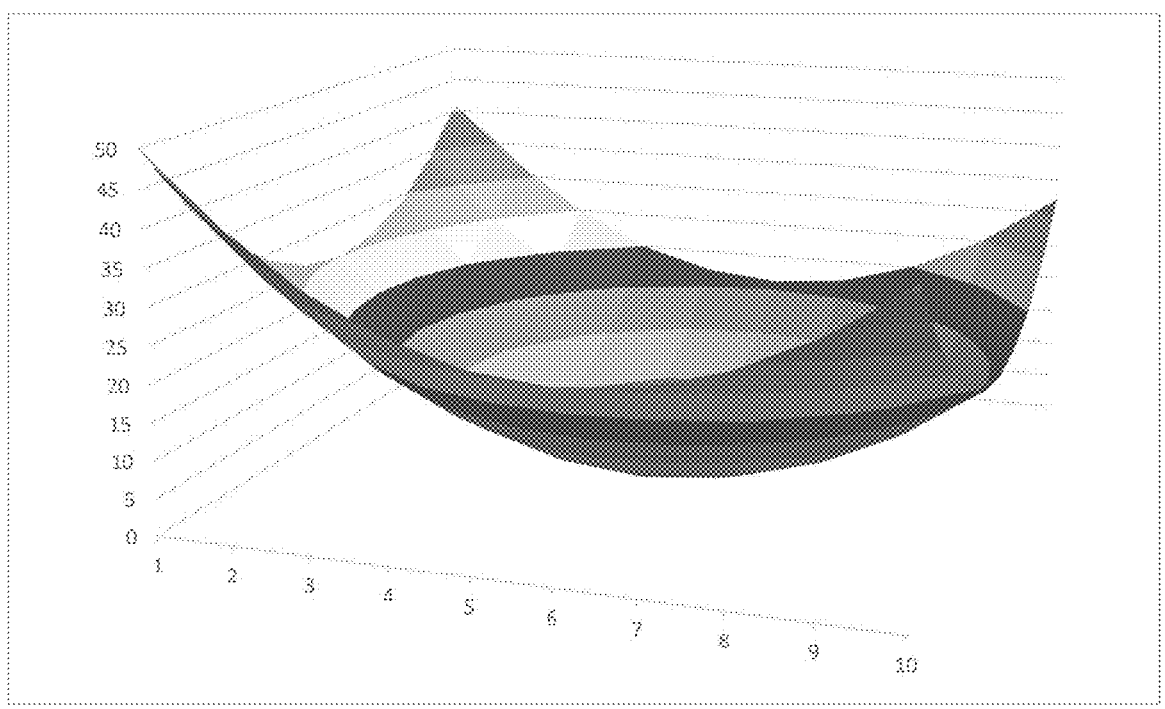
FIG. 11C shows a graph depicting the Fresnel lens surface represented by the Fresnel lens values F(x, y)

In practice, a stream of Fresnel lens values F(x, y) is provided for writing to the pixels to provide the software lens function, wherein each Fresnel lens value is derived from the sum of each x coordinate Fresnel lens value F(x) and the corresponding y coordinate Fresnel lens value F(y). FIG. 11A shows the Fresnel lens values F(x, y) that may be written to the 10×10 pixel array of FIG. 8 by summing each x coordinate Fresnel lens value F(x) in the stream of FIGS. 9A and 9B and each corresponding y coordinate Fresnel lens value F(y) in the stream of FIGS. 10A and 10B. As the skilled person will appreciate, FIGS. 11A and 11B show normalized values of lens data representing a Fresnel lens centered at coordinate (0, 0) of the 10×10 pixel array of FIG. 8. This is further illustrated in FIG. 11C, which is a plot of the Fresnel lens values F(x, y) written to the pixel array as in FIG. 11A, showing the surface profile of the Fresnel lens centered at pixel coordinate (0,0).

As the skilled person will appreciate, in practice the lens data comprising the Fresnel lens values F(x, y) are combined with hologram data as described above. Thus, the display value written to each pixel P(x, y) of the SLM pixel array at coordinate (x, y) comprises the sum of the Fresnel lens value F(x, y) as described herein and the corresponding hologram pixel value.

Multi-Threaded Integer Squares Calculation

In the above embodiments, the Fresnel lens values F(x, y) for the pixels P(x, y) of an SLM pixel array are calculated from a single x coordinate pipeline that generates a single stream of x coordinate Fresnel lens value F(x) and a single y coordinate pipeline that generates a single stream of y coordinate Fresnel lens value F(y). However, in practice, the pixel array has a very large number of pixels P(x, y). In consequence, the calculation of a single stream of x coordinate integer square values $x^2$ and a corresponding single stream of x coordinate Fresnel lens values F(x) for the SLM pixel array may not be sufficiently fast for video rate streaming. As the skilled person will appreciate, this problem is less significant when calculating the y coordinate Fresnel lens values F(y) since each calculated value is repeated n times in the output stream, thereby allowing more time to calculate the next value. Accordingly, in alternative embodiments, the calculation of the x coordinate integer square values $x^2$ is performed by multiple logic sub-circuits operating in parallel, and thus in multiple threads k, where k>1, so as to more quickly generate the x coordinate Fresnel lens values F(x).

In particular, the data stream of x coordinate Fresnel lens values F(x) is generated by k logic sub-circuits operating concurrently (e.g. arranged in parallel). Each of the k logic sub-circuits generates a corresponding data stream, Sk, comprising a subset of x coordinate Fresnel lens values F(x) of the complete data stream. The k data streams, Sk, of x coordinate Fresnel lens values F(x) may be combined to form a single stream, S, of x coordinate Fresnel lens values F(x).

Figure 12A:
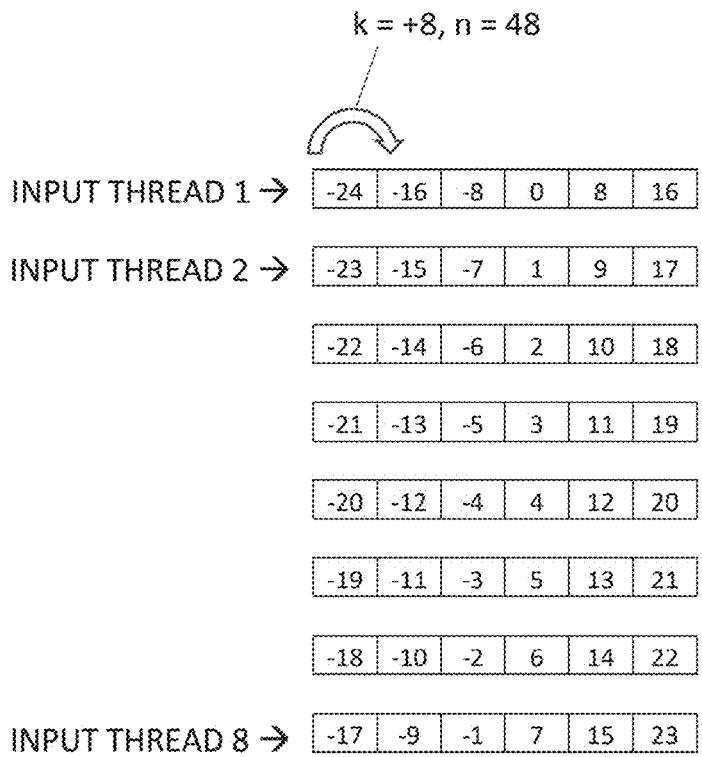
FIG. 12A shows input streams of integer values of a plurality of threads of a multi-threaded logic circuit and FIG. 12B shows corresponding output streams of integer square values of the plurality of threads of the multi-threaded logic circuit in accordance with further embodiments.
Figure 12B:
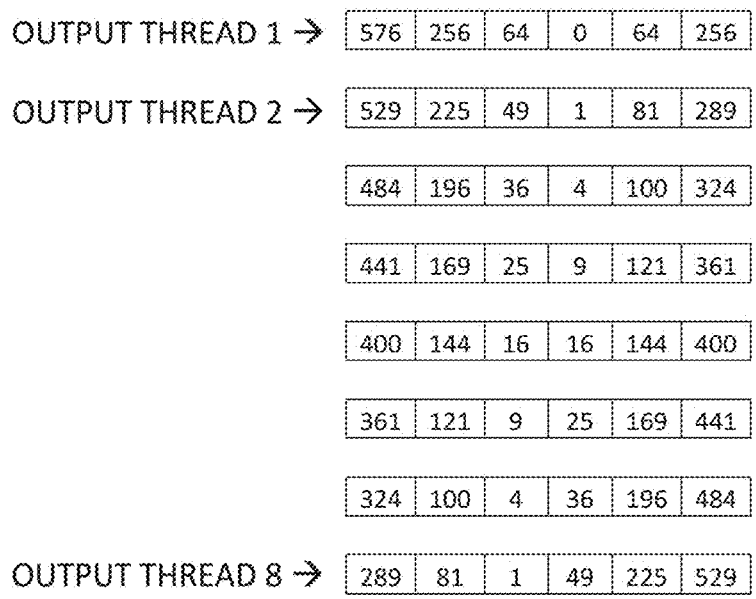

FIGS. 12A and 12B show an example of the multi-threaded calculation of x coordinate integer square values, $x^2$, for calculating corresponding x coordinate Fresnel lens values F(x) to provide a complete data stream of x coordinate Fresnel lens values for an [m×n] pixel array. The illustrated example has a plurality of k threads for generating a corresponding plurality of k data streams of integer square values $x^2$. In the illustrated example, k=8. In addition, the number of pixels n in the x direction for the illustrated example is 48, whereby the pixel coordinates x are numbered from −24 to 23. Each of the k processing threads is performed by a corresponding logic sub-circuit in accordance with the present disclosure, such as the circuit stage 600 of FIG. 6. However, in contrast to the embodiment of FIG. 6, the logic sub-circuit generates x coordinate integer square values $x^2$ for an input sequence of x coordinate integers comprising an arithmetic progression of integer numbers having a common difference or increment of k (i.e. 8). Thus, the integer square difference value is $(X^2-(X-k)^2)$. Furthermore, instead of adding two to the difference value stored in the data register 616 from the previous calculation, the adder 617 adds $2k^2$ (i.e. 128).

Each logic sub-circuit or thread of the k threads receives an input sequence of x coordinate integer values comprising a different subset of the x coordinate integer values of the [m × n] pixel array. The first thread receives an input sequence comprising an arithmetic progression of x coordinate integers with a starting value a corresponding to the x coordinate of first pixel $x_1$ (i.e. −24) and an increment between integers of k. Each consecutive thread of the k threads shown in FIG. 12A adds one (1) to the starting integer value a of the immediately preceding thread. Thus, in the example shown in FIG. 12A, the first thread (input thread 1) processes the subset of integers {−24, −16, −8, 0, 8, 16}, the second thread processes the subset of integers {−23, −15, −7, 1, 9, 17}, the third thread processes the subset of integers {−22, −14, −6, 2, 10, 18} and so on. The kth thread (input thread 8) processes the subset of integers {−17, −9, −1, 7, 15, 23}. Thus, the k threads together process all of the n integer values for x (from −24 to 23) to generate corresponding integer square values $x^2$.

The output data streams of integer square values $x^2$ of the k threads shown in FIG. 12A are illustrated in FIG. 12B.

The calculations performed by the first thread in FIGS. 12A and 12B are shown in Table 3 below, where n=48, k=8, (2 $m^2$=128), A=$(X-k)^2$ and B=$(X^2-(X-k)^2)+2k^2$

TABLE 3

| X | −24 | −16 | −8 | 0 | 8 | 16 |
|---|---|---|---|---|---|---|
| A | 625 | 576 | 256 | 64 | 0 | 64 |
| B | −448 | −320 | −192 | −64 | 64 | 192 |
| A + B | 576 | 256 | 64 | 0 | 64 | 256 |

Thus, each logic sub-circuit and corresponding thread performs just n/k (i.e. 48/8=6) iterations of the integer square function (calculations of A+B). Since the k threads process their respective subsets of x coordinate integer values at substantially the same time (e.g. in parallel), the time required to generate the complete data stream of x coordinate integer square values is reduced by a factor of k (i.e. 8). This significantly reduces the processing time to generate the complete stream of x coordinate integer square values $x^2$ needed to generate the x coordinate Fresnel lens values F(x) for all of the [m×n] pixels of the pixel array.

In embodiments, the calculation of the x coordinate Fresnel lens values F(x) is performed by the k logic sub-circuits as part of the k processing threads. Thus, the calculation of the x coordinate Fresnel lens values F(x) from each subset of x coordinate integer square values $x^2$ is performed at substantially the same time (e.g. in parallel), and each of the k logic sub-circuit concurrently outputs a corresponding stream, Sk, of Fresnel lens values F(x).

As the skilled person will appreciate, for embodiments that generate the integer square values in a single thread (i.e. k=1) only a single circuit stage 600 is required to calculate the integer square values for the x coordinate pipeline. However, the processing time for calculating the integer square values $x^2$, and thus the Fresnel lens values F(x), is proportional to the number of pixel values in the x direction. In the case of large SLM pixel arrays, this processing time may be too long to allow for calculation of Fresnel lens values F(x) at high frame speeds (e.g. video rate). In contrast, embodiments that perform multi-threading (i.e. k>1) can significantly reduce the processing time so as to achieve video rate frame speeds. However, such embodiments require multiple logic sub-circuits 600, one for each thread in the x coordinate processing pipeline. This requirement for additional logic sub-circuits 600 is generally not unduly burdensome in terms of cost, design effort and consumption of die area, particularly when implemented in a PLD (e.g. FPGA) or structured ASIC, in which the duplication of logic stages is a straightforward design programming task.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the detector is a photodetector such as a photodiode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In this case, the Fresnel lens values F(x, y) are calculated using the integer values/coordinates of [m×n] pixels corresponding to the hologram pixels. In some of these other embodiments, part of the hologram (that is, a continuous subset of the pixels of the hologram) is repeated in the unused pixels. Likewise, since the Fresnel lens values F(x, y) are combined with the hologram pixel values, a corresponding part of the lens data is repeated in the unused pixels. This technique may be referred to as "tiling" wherein the surface area of the spatial light modulator is divided up into a number of "tiles", each of which represents at least a subset of the hologram and corresponding lens data. Each tile is therefore of a smaller size than the spatial light modulator. In some embodiments, the technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In embodiments, only the primary replay field is utilised and system comprises physical blocks, such as baffles, arranged to restrict the propagation of the higher order replay fields through the system.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic projector comprising:
a pixelated display device;
a light source arranged to illuminate the pixelated display device with light having a wavelength, $\lambda$; and
a logic circuit comprising a first logic sub-circuit arranged to output a stream, S1, of Fresnel lens values, F(x), of a Fresnel lens for display on [m×n] pixels of the pixelated display device, wherein the logic circuit is arranged to:
(a) set an initial data value stored in a first data register unit of the first logic sub-circuit to $(a-k)^2$ and set an initial data value stored in a second data register unit of the first logic sub-circuit to $a^2-(a-k)^2$;
(b) in a first iteration, read the initial data value stored in the first data register unit of the first logic sub-circuit and the initial data value stored in the second data register unit of the first logic sub-circuit, or in a further iteration, read the data value stored in the first data register unit of the first logic sub-circuit in the preceding iteration and the data value stored in the second data register unit of the first logic sub-circuit in the preceding iteration;
(c) sum the data value read from the first data register unit of the first logic sub-circuit and the data value read from the second data register unit of the first logic sub-circuit to form $x^2$;
(d) calculate F(x) based on $x^2$;
(e) output F(x) as the next value in the stream of F(x) values;
(f) write $x^2$ to the first data register unit of the first logic sub-circuit;
(g) add $2k^2$ to the value stored in the second data register unit of the first logic sub-circuit; and
(h) perform further iterations that repeat steps (b) to (g) for x=a+k, a+2k, a+3k . . . a+(n−1)k, wherein a is the starting value of x, k is an increment in x and F(a) is the first value of stream, S1,
wherein the pixelated display device is configured to display a light modulation pattern comprising a Fresnel lens pattern in accordance with the stream of Fresnel lens values, F(x), and to modulate light having the wavelength 2 received from the light source with the light modulation pattern.

2. The holographic projector as claimed in claim 1, wherein the logic circuit comprises a plurality, k, of first logic sub-circuits, wherein the plurality of first logic sub-circuits are arranged in parallel and each first logic sub-circuit is arranged to output a respective stream, S1, S2 . . . Sk, of Fresnel lens values, F(x), by performing steps (a) to (h) using a respective value of a, wherein the streams, S1, S2 . . . Sk, correspond to a=$x_1$, $x_1$+1, $x_1$+2 . . . $x_1$+(k−1), respectively.

3. The holographic projector as claimed in claim 1 wherein $x_1$=−n/2 or $x_1$=1−n/2.

4. The holographic projector claimed in claim 1 wherein F(x) is calculated based on $x^2$ using the following equation:

$$F(x) = \frac{\pi p_x^2}{f_x \lambda} x^2$$

wherein $f_x$ is the focal length of the Fresnel lens in the x-direction, $\lambda$ is the wavelength of light and $p_x$ is the pixel size of the pixelated display device in the x-direction.

5. The holographic projector as claimed in claim 1 wherein the first data register unit of the first logic sub-circuit comprises a first input register, a first data register and a first multiplexer for selecting between a data value stored in the first input register and a data value stored in the first data register, and the second data register unit of the first logic sub-circuit comprises a second input register, a second data register and a second multiplexer for selecting between a data value stored in the second input register and a data value stored in the second data register, wherein the logic circuit is further arranged to:
  provide a reset signal to the first and second multiplexers in the first iteration of step (b), in order to select the initial data values stored in the respective first and second input registers, and
  not provide a reset signal to the first and second multiplexers in further iterations of step (b), in order to select the data values stored in the respective first and second data registers in the preceding iteration.

6. The holographic projector as claimed in claim 1 further arranged to output a stream of Fresnel lens values, F(y), of the Fresnel lens, wherein the logic circuit is arranged to perform the following steps iteratively for y=b, b+1, b+2, ... (b+m−1):
  (i) if y=b, set an initial data value stored in a first data register unit of a second logic sub-circuit to $(b-1)^2$ and set an initial data value stored in a second data register unit of the second logic sub-circuit to $b^2-(b-1)^2$;
  (j) if y=b, read the initial data value stored in the first data register unit of the second logic sub-circuit and the initial data value stored in the second data register unit of the second logic sub-circuit, or if y≠b, read the data value stored in the first data register unit of the second logic sub-circuit in the preceding iteration and the data value stored in the second data register unit of the second logic sub-circuit in the preceding iteration;
  (k) sum the data value read from the first data register unit of the second logic sub-circuit and the data value read from the second data register unit of the second logic sub-circuit to form $y^2$;
  (l) calculate F(y) based on $y^2$;
  (m) output F(y) as the next value in the stream of F(y) values;
  (n) write $y^2$ to the first data register unit of the second logic sub-circuit; and
  (o) add two to the value stored in the second data register unit of the second logic sub-circuit,
wherein b is the starting value of y and F(b) is the first value of the stream of Fresnel lens values, F(y).

7. The holographic projector as claimed in claim 6 wherein
  b=−m/2 or 1−m/2.

8. The holographic projector as claimed in claim 6 wherein the logic circuit is arranged to calculate F(y) based on $y^2$ using the following equation:

$$F(y) = \frac{\pi p_y^2}{f_y \lambda} y^2$$

wherein $f_y$ is the focal length of the Fresnel lens in the y-direction, $\lambda$ is the wavelength of light and $p_y$ is the pixel size of the pixelated display device in the y-direction.

9. The holographic projector as claimed in claim 6 wherein step (m) outputs the value F(y) as the next n values in the stream of F(y) values.

10. The holographic projector as claimed in claim 6 further arranged to sum each F(x) value with a corresponding F(y) value in order to form a stream of Fresnel lens values, F(x, y), for each pixel.

11. The holographic projector as claimed in claim 10, wherein the logic circuit is provided as a logic device comprising the logic circuit, the logic device comprising an application specific integrated circuit, ASIC, or a programmable logic device, PLD.

12. The holographic projector as claimed in claim 10, wherein the logic circuit is provided as a logic device comprising the logic circuit, the logic device comprising a field programmable gate array, FPGA.

13. A holographic projector as claimed in claim 1, wherein the light modulation pattern comprises a sum of
  the Fresnel lens pattern in accordance with the stream of Fresnel lens values Fresnel lens values, F(x); and
  a hologram pixel pattern in accordance with a stream of hologram pixel values.

14. A holographic projector as claimed in claim 11 wherein the logic device is further arranged to add the Fresnel lens values of the stream of Fresnel lens values to hologram pixel values of a stream of hologram pixel values to form a data stream of display values, wherein the light modulation pattern is formed in accordance with the stream of display values provided to the pixelated display device by the logic device.

15. A head-up display comprising the holographic projector of claim 1.

16. A method of holographic projection, the method comprising:
  providing light having a wavelength, $\lambda$;
  illuminating a pixelated display device with the light having the wavelength, $\lambda$;
  providing a stream of Fresnel lens values, F(x), by a method comprising:
    (a) setting an initial data value stored in a first data register unit of a first logic sub-circuit to $(a-k)^2$ and setting an initial data value stored in a second data register unit of the first logic sub-circuit to $a^2-(a-k)^2$;
    (b) in a first iteration, reading the initial data value stored in the first data register unit of the first logic sub-circuit and the initial data value stored in the second data register unit of the first logic sub-circuit, or in a further iteration, reading the data value stored in the first data register unit of the first logic sub-circuit in the preceding iteration and the data value stored in the second data register unit of the first logic sub-circuit in the preceding iteration;
    (c) summing the data value read from the first data register unit of the first logic sub-circuit and the data value read from the second data register unit of the first logic sub-circuit to form $x^2$;
    (d) calculating F(x) based on $x^2$;
    (e) outputting F(x) as the next value in the stream of F(x) values;
    (f) writing $x^2$ to the first data register unit of the first logic sub-circuit;
    (g) adding $2k^2$ to the value stored in the second data register unit of the first logic sub-circuit; and
    (h) performing further iterations comprising repeating steps (b) to (g) for x=a+k, a+2k, a+3k ... a+(n−1)k, wherein a is the starting value of x, k is an increment in x and F(a) is the first value of stream, S1;
  displaying on [m×n] pixels of the pixelated display device a light modulation pattern comprising a Fresnel lens pattern in accordance with the stream of Fresnel lens values F(x); and
  modulating the light having the wavelength $\lambda$ received from the light source with the light modulation pattern.

17. A method as claimed in claim 16, wherein the light modulation pattern comprises a sum of
the Fresnel lens pattern in accordance with the stream of Fresnel lens values Fresnel lens values, F(x); and
a hologram pixel pattern in accordance with a stream of hologram pixel values.

18. A method of holographic projection, the method comprising:
providing light having a wavelength, $\lambda$;
illuminating a pixelated display device with light having the wavelength, $\lambda$;
providing a stream of Fresnel lens values, F(y), by a method comprising performing the following steps iteratively for y=b, b+1, b+2, . . . (b+m−1):
(i) if y=b, setting an initial data value stored in a first data register unit of a second logic sub-circuit to $(b-1)^2$ and setting an initial data value stored in a second data register unit of the second logic sub-circuit to $b^2-(b-1)^2$;
(j) if y=b, reading the initial data value stored in the first data register unit of the second logic sub-circuit and the initial data value stored in the second data register unit of the second logic sub-circuit, or if y≠b, reading the data value stored in the first data register unit of the second logic sub-circuit in the preceding iteration and the data value stored in the second data register unit of the second logic sub-circuit in the preceding iteration;
(k) summing the data value read from the first data register unit of the second logic sub-circuit and the data value read from the second data register unit of the second logic sub-circuit to form $y^2$;
(l) calculating F(y) based on $y^2$;
(m) outputting F(y) as the next value in the stream of F(y) values;
(n) writing $y^2$ to the first data register unit of the second logic sub-circuit; and
(o) adding two to the value stored in the second data register unit of the second logic sub-circuit,
wherein b is the starting value of y and F(b) is the first value of the stream of Fresnel lens values, F(y);
displaying on [m×n] pixels of the pixelated display device a light modulation pattern comprising a Fresnel lens pattern in accordance with the stream of Fresnel lens values F(y); and
modulating the light having the wavelength $\lambda$ received from the light source with the light modulation pattern.

19. A method of holographic projection, the method comprising:
providing light having a wavelength, $\lambda$;
illuminating a pixelated display device with the light having the wavelength, $\lambda$;
providing a stream of Fresnel lens values, F(x, y), by a method comprising
providing a stream of Fresnel lens values, F(x), by a method comprising:
(a) setting an initial data value stored in a first data register unit of a first logic sub-circuit to $(a-k)^2$ and setting an initial data value stored in a second data register unit of the first logic sub-circuit to $a^2-(a-k)^2$;
(b) in a first iteration, reading the initial data value stored in the first data register unit of the first logic sub-circuit and the initial data value stored in the second data register unit of the first logic sub-circuit, or in a further iteration, reading the data value stored in the first data register unit of the first logic sub-circuit in the preceding iteration and the data value stored in the second data register unit of the first logic sub-circuit in the preceding iteration;
(c) summing the data value read from the first data register unit of the first logic sub-circuit and the data value read from the second data register unit of the first logic sub-circuit to form $x^2$;
(d) calculating F(x) based on $x^2$;
(e) outputting F(x) as the next value in the stream of F(x) values;
(f) writing $x^2$ to the first data register unit of the first logic sub-circuit;
(g) adding $2k^2$ to the value stored in the second data register unit of the first logic sub-circuit; and
(h) performing further iterations comprising repeating steps (b) to (g) for x=a+k, a+2k, a+3k . . . a+(n−1)k, wherein a is the starting value of x, k is an increment in x and F(a) is the first value of stream, S1;
providing a stream of Fresnel lens values, F(y), by a method comprising performing the following steps iteratively for y=b, b+1, b+2, . . . (b+m−1):
(p) if y=b, setting an initial data value stored in a first data register unit of a second logic sub-circuit to $(b-1)^2$ and setting an initial data value stored in a second further data register unit of the second logic sub-circuit to $b^2-(b-1)^2$;
(q) if y=b, reading the initial data value stored in the first data register unit of the second logic sub-circuit and the initial data value stored in the second data register unit of the second logic sub-circuit, or if y≠b, reading the data value stored in the first data register unit of the second logic sub-circuit in the preceding iteration and the data value stored in the second data register unit of the second logic sub-circuit in the preceding iteration;
(r) summing the data value read from the first data register unit of the second logic sub-circuit and the data value read from the second data register unit of the second logic sub-circuit to form $y^2$;
(s) calculating F(y) based on $y^2$;
(t) outputting F(y) as the next value in the stream of F(y) values;
(u) writing $y^2$ to the first data register unit of the second logic sub-circuit; and
(v) adding two to the value stored in the second data register unit of the second logic sub-circuit,
wherein b is the starting value of y and F(b) is the first value of the stream of Fresnel lens values, F(y); and
summing each F(x) value of the stream of F(x) values with a corresponding F(y) value of the stream of F(y) values;
displaying on [m×n] pixels of the pixelated display device a light modulation pattern comprising a Fresnel lens pattern in accordance with the stream of Fresnel lens values, F(x, y); and
modulating the light having the wavelength $\lambda$ received from the light source with the light modulation pattern.

20. A method as claimed in claim 19, wherein the light modulation pattern comprises a sum of
the Fresnel lens pattern in accordance with the stream of Fresnel lens values Fresnel lens values, F(x, y); and
a hologram pixel pattern in accordance with a stream of hologram pixel values.

21. A non-transitory computer-readable medium comprising instructions stored thereon, when executed by a processor, perform a method for providing a stream of Fresnel lens values, F(x), for display on [m×n] pixels of a pixelated display device, the method comprising:
- (a) setting an initial data value stored in a first data register unit of a first logic sub-circuit to $(a-k)^2$ and setting an initial data value stored in a second data register unit of the first logic sub-circuit to $a^2-(a-k)^2$;
- (b) in a first iteration, reading the initial data value stored in the first data register unit of the first logic sub-circuit and the initial data value stored in the second data register unit of the first logic sub-circuit, or in a further iteration, reading the data value stored in the first data register unit of the first logic sub-circuit in the preceding iteration and the data value stored in the second data register unit of the first logic sub-circuit in the preceding iteration;
- (c) summing the data value read from the first data register unit of the first logic sub-circuit and the data value read from the second data register unit of the first logic sub-circuit to form $x^2$;
- (d) calculating F(x) based on $x^2$;
- (e) outputting F(x) as the next value in the stream of F(x) values;
- (f) writing $x^2$ to the first data register unit of the first logic sub-circuit;
- (g) adding $2k^2$ to the value stored in the second data register unit of the first logic sub-circuit; and
- (h) performing further iterations comprising repeating steps (b) to (g) for x=a+k, a+2k, a+3k . . . a+(n−1)k, wherein a is the starting value of x, k is an increment in x and F(a) is the first value of stream, S1.

* * * * *